United States Patent
Batta et al.

(10) Patent No.: US 11,064,281 B1
(45) Date of Patent: *Jul. 13, 2021

(54) SENDING AND RECEIVING WIRELESS DATA

(71) Applicant: Amazon Technologies, Inc., Seattle, WA (US)

(72) Inventors: Ganesha Batta, Cupertino, CA (US); Milos Jorgovanovic, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/113,356

(22) Filed: Aug. 27, 2018

Related U.S. Application Data

(60) Provisional application No. 62/683,833, filed on Jun. 12, 2018, provisional application No. 62/656,490, (Continued)

(51) Int. Cl.
H04R 1/10 (2006.01)
G06F 3/16 (2006.01)

(52) U.S. Cl.
CPC ........... H04R 1/1041 (2013.01); G06F 3/167 (2013.01); H04R 1/1016 (2013.01); H04R 2420/07 (2013.01)

(58) Field of Classification Search
CPC .......................... H04R 5/033; H04R 2420/07; H04R 2420/05; H04R 1/1041; H04R 2420/03; H04R 2499/11; H04R 3/12; H04R 1/10; H04R 1/1016; H04R 1/1091; H04R 2201/107; H04R 2420/09; H04R 3/00; H04R 5/02; H04R 5/04; H04W 4/80; H04W 4/023; H04W 84/18; H04W 28/18; H04W 4/00; H04W 4/50; H04W 72/0446; H04W 76/10; H04W 84/10; H04W 88/02; H04W 88/04; H04W 88/14; H04W 8/005; H04W 8/18; H04W 92/18; H04M 1/6066;
(Continued)

(56) References Cited

U.S. PATENT DOCUMENTS 10,200,791 B1 * 2/2019 Liu .......................... H04W 4/80
10,206,039 B1 * 2/2019 Yun ......................... G06F 3/165
(Continued)

FOREIGN PATENT DOCUMENTS

EP 2947899 A1 11/2015

OTHER PUBLICATIONS

Platta Chaves "International Search Report and Written Opinion issued in International Application No. PCT/US2020/02113", dated May 4, 2020, 16 pages.

*Primary Examiner* — Golam Sorowar
(74) *Attorney, Agent, or Firm* — Pierce Atwood LLP

(57) ABSTRACT

A system and method includes a first device (e.g., a primary wireless earbud) connected to a second device (e.g., a secondary wireless earbud) using a first wireless connection. The first device is also connected to a third device (e.g., a smartphone or smart watch) using a second wireless connection. The second device receives data, such as packets, sent from the third device to the first device by monitoring the second wireless connection. If the second device does not receive a packet, it informs the first device, which sends the packet to the second device.

22 Claims, 20 Drawing Sheets

Related U.S. Application Data filed on Apr. 12, 2018, provisional application No. 62/586,419, filed on Nov. 15, 2017.

(58) Field of Classification Search
CPC .......... H04M 2250/02; H04M 1/6091; H04M 1/72519; H04M 1/72558; H04M 1/72563; H04M 2250/12; H04M 2250/52; H04M 1/271; H04M 1/725; H04M 1/7253

See application file for complete search history.

(56) References Cited

U.S. PATENT DOCUMENTS

| | | | |
|---|---|---|---|
| 10,206,084 B2* | 2/2019 | Chen | H04W 4/80 |
| 10,244,307 B1* | 3/2019 | Tong | H04L 1/16 |
| 2004/0107271 A1* | 6/2004 | Ahn | H04M 1/6066 |
| | | | 709/219 |
| 2009/0109894 A1* | 4/2009 | Ueda | H04M 1/6066 |
| | | | 370/315 |
| 2010/0232618 A1* | 9/2010 | Haartsen | H04L 1/0003 |
| | | | 381/80 |
| 2012/0058727 A1* | 3/2012 | Cook | H04R 3/00 |
| | | | 455/41.3 |
| 2012/0135685 A1* | 5/2012 | Higgins | H04B 1/385 |
| | | | 455/41.2 |
| 2015/0154963 A1* | 6/2015 | Weng | G10L 15/06 |
| | | | 704/500 |
| 2016/0112825 A1* | 4/2016 | Miller | H04W 12/04 |
| | | | 455/41.2 |
| 2017/0366924 A1* | 12/2017 | Thoen | H04L 1/245 |
| 2018/0270753 A1* | 9/2018 | Recker | H04W 4/80 |

* cited by examiner

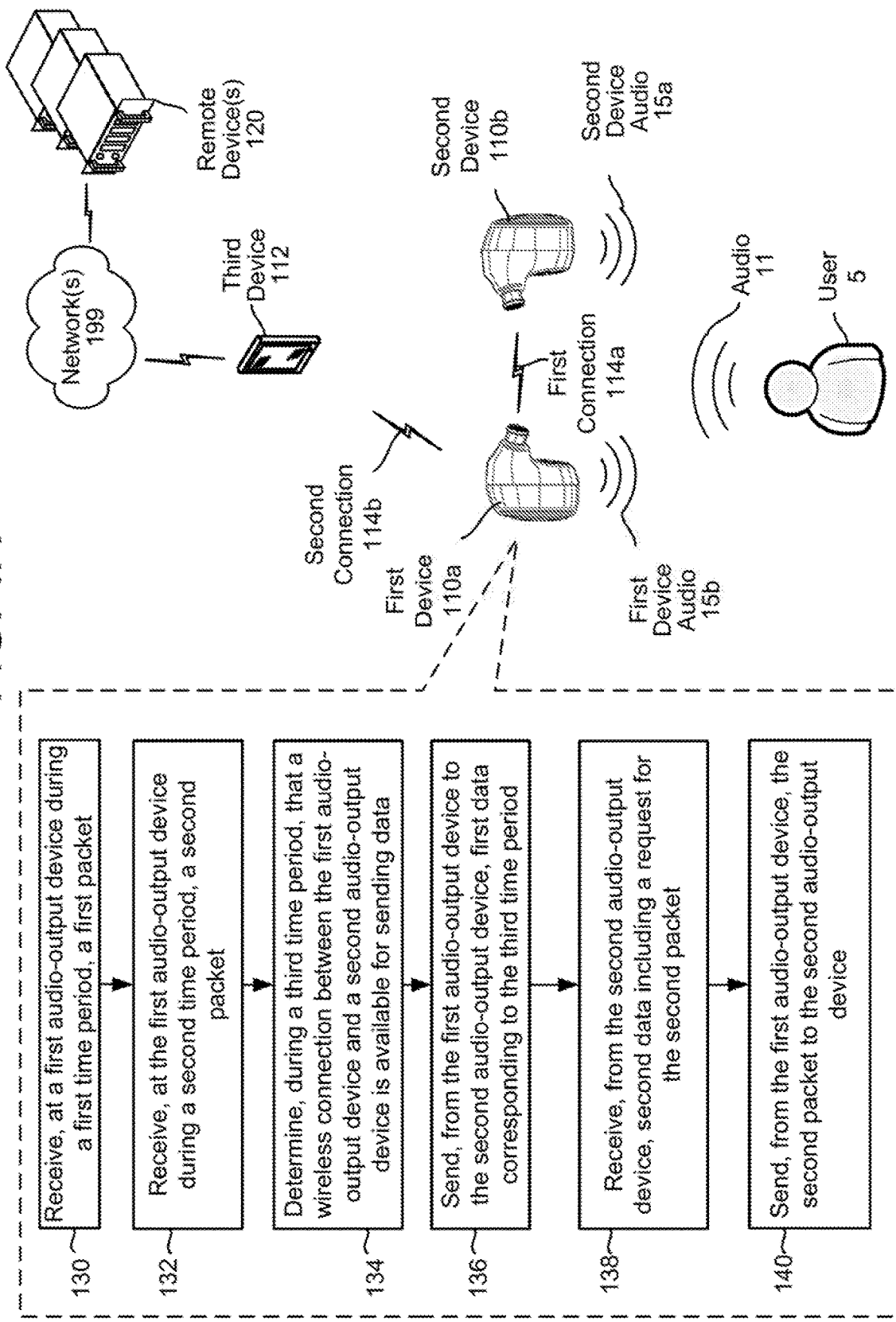

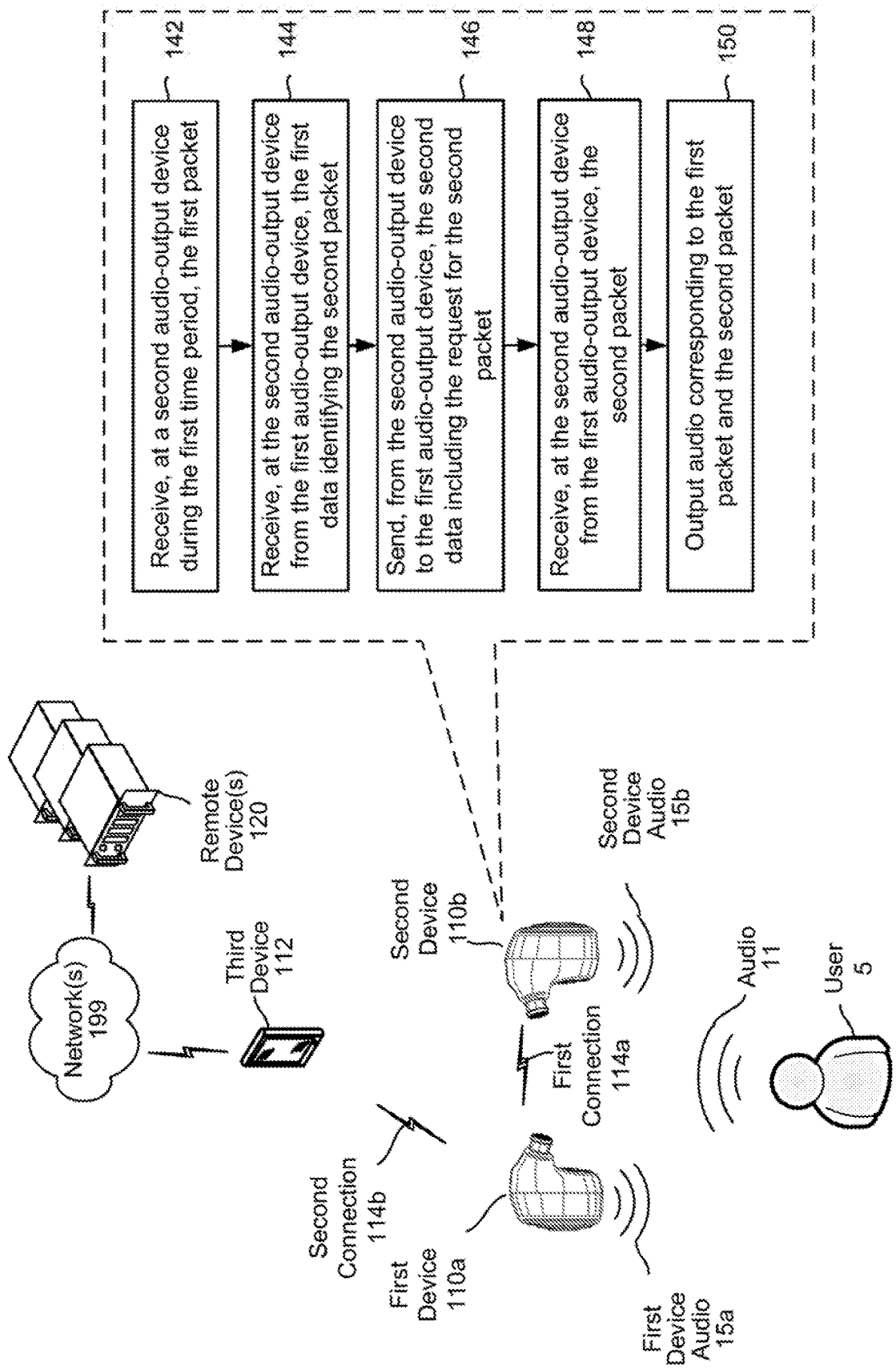

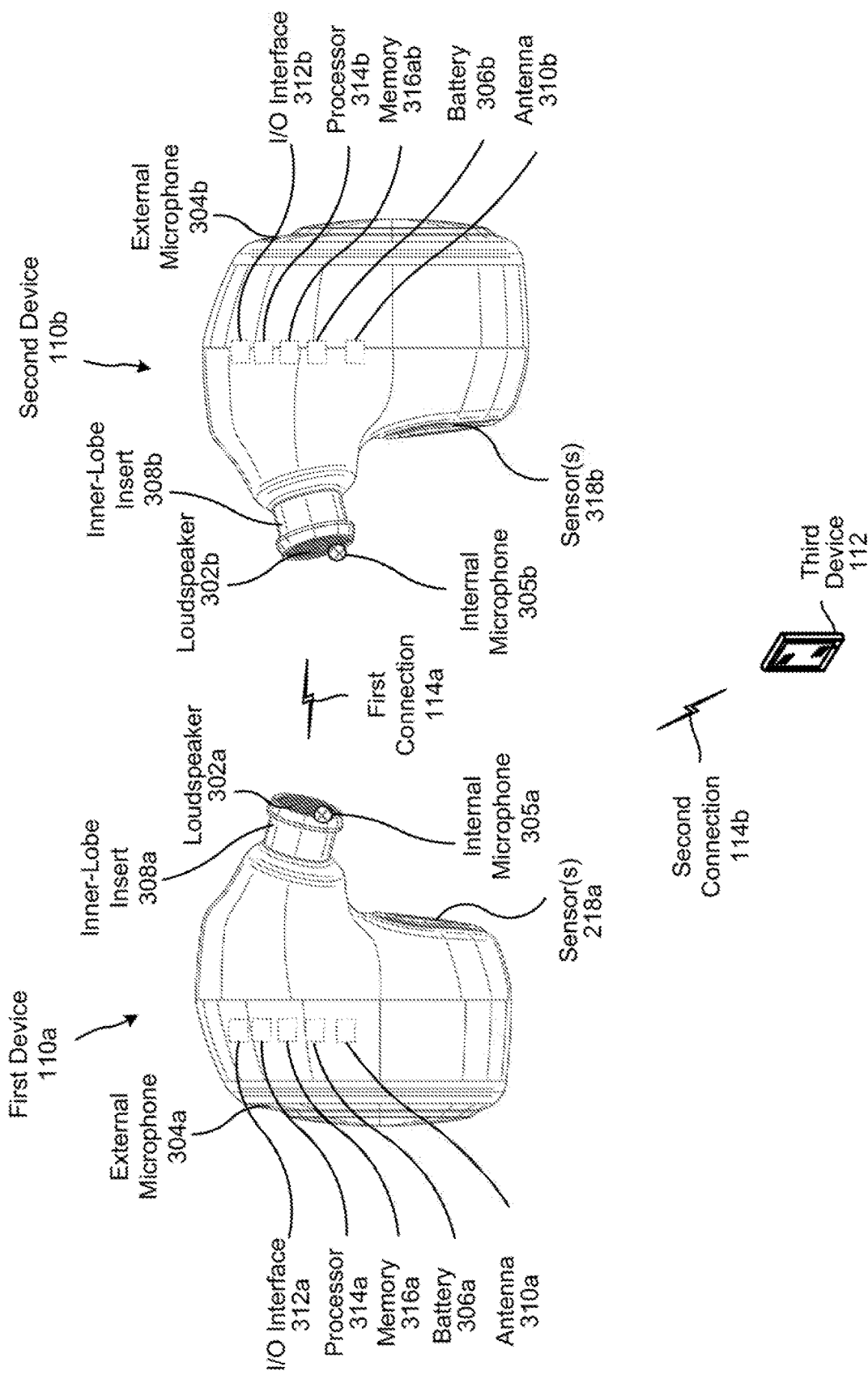

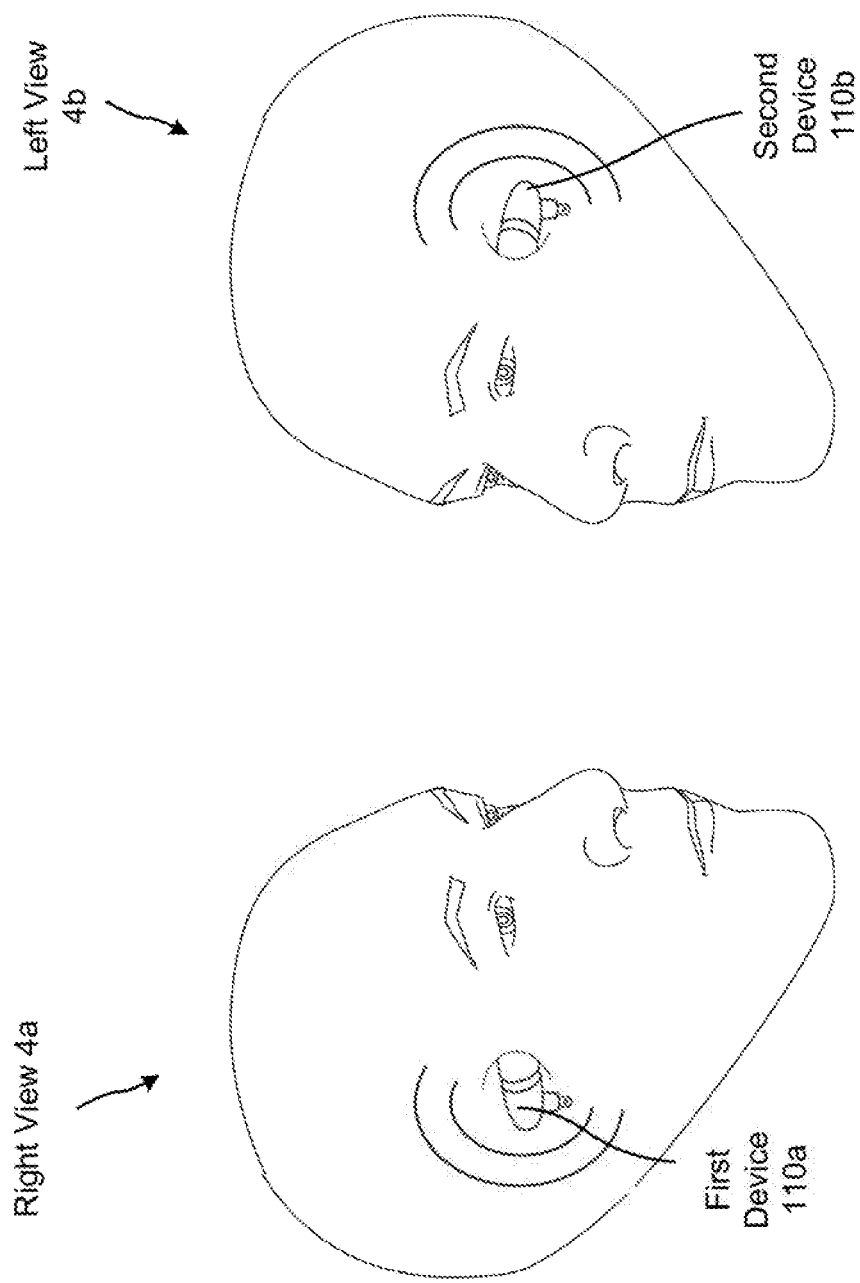

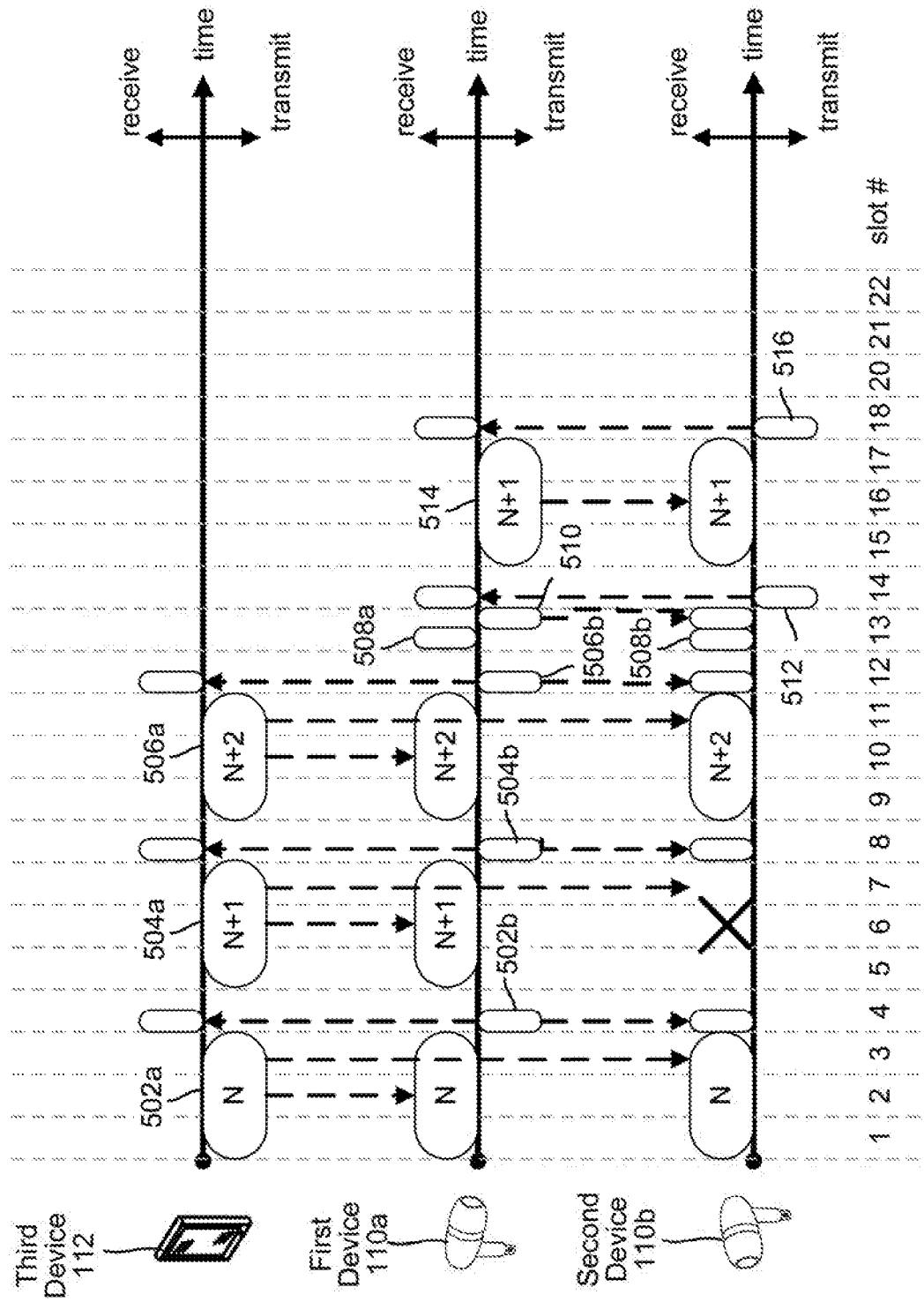

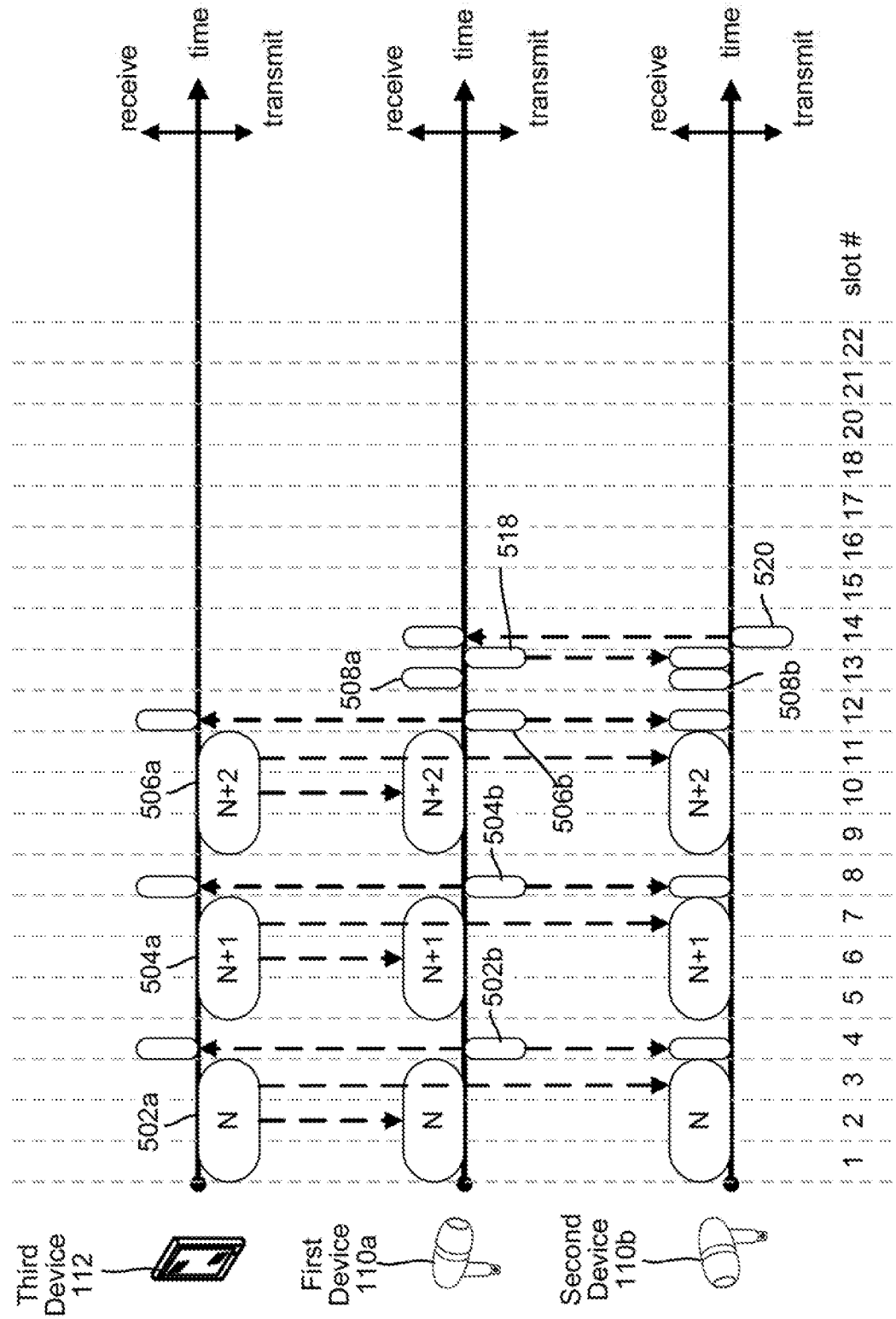

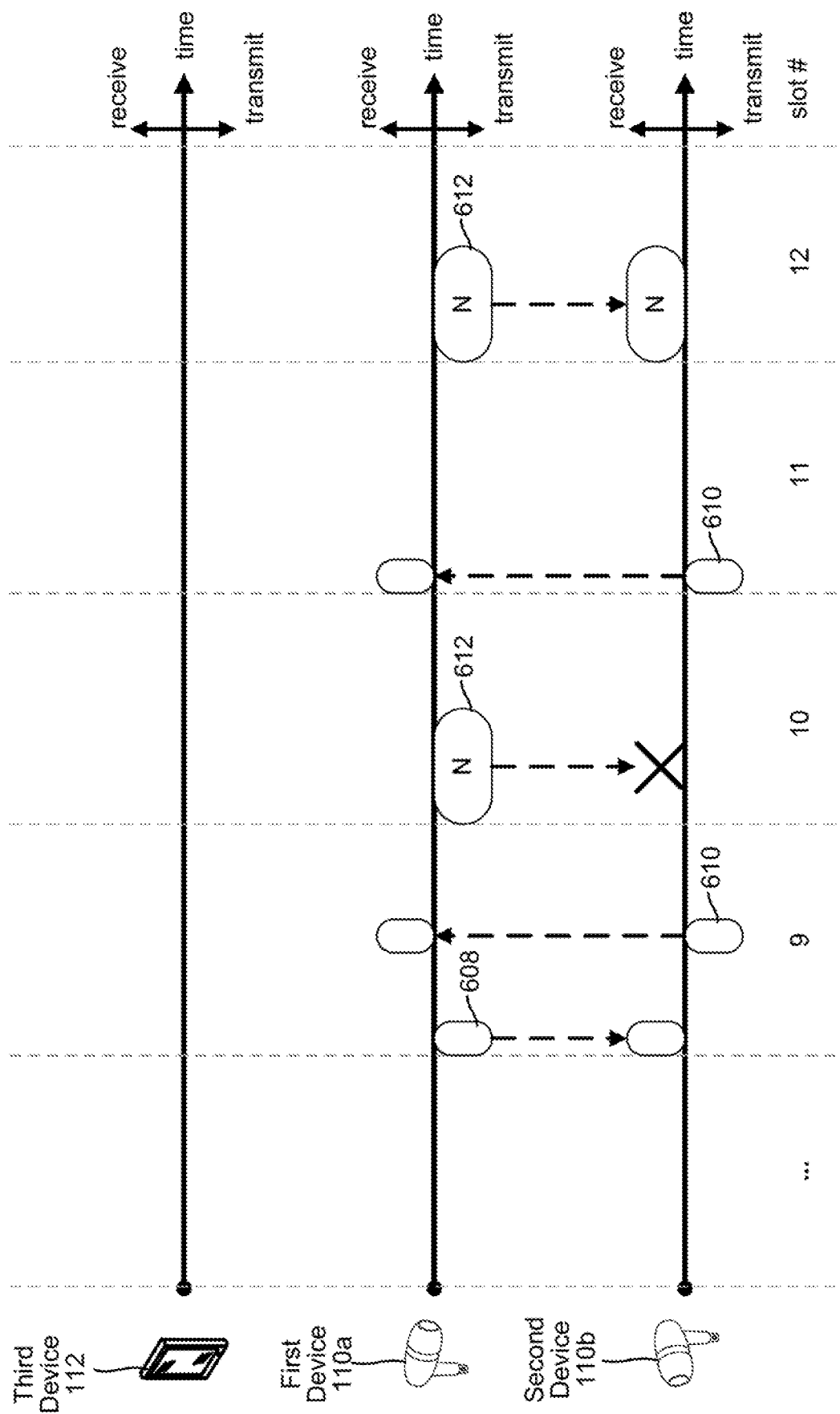

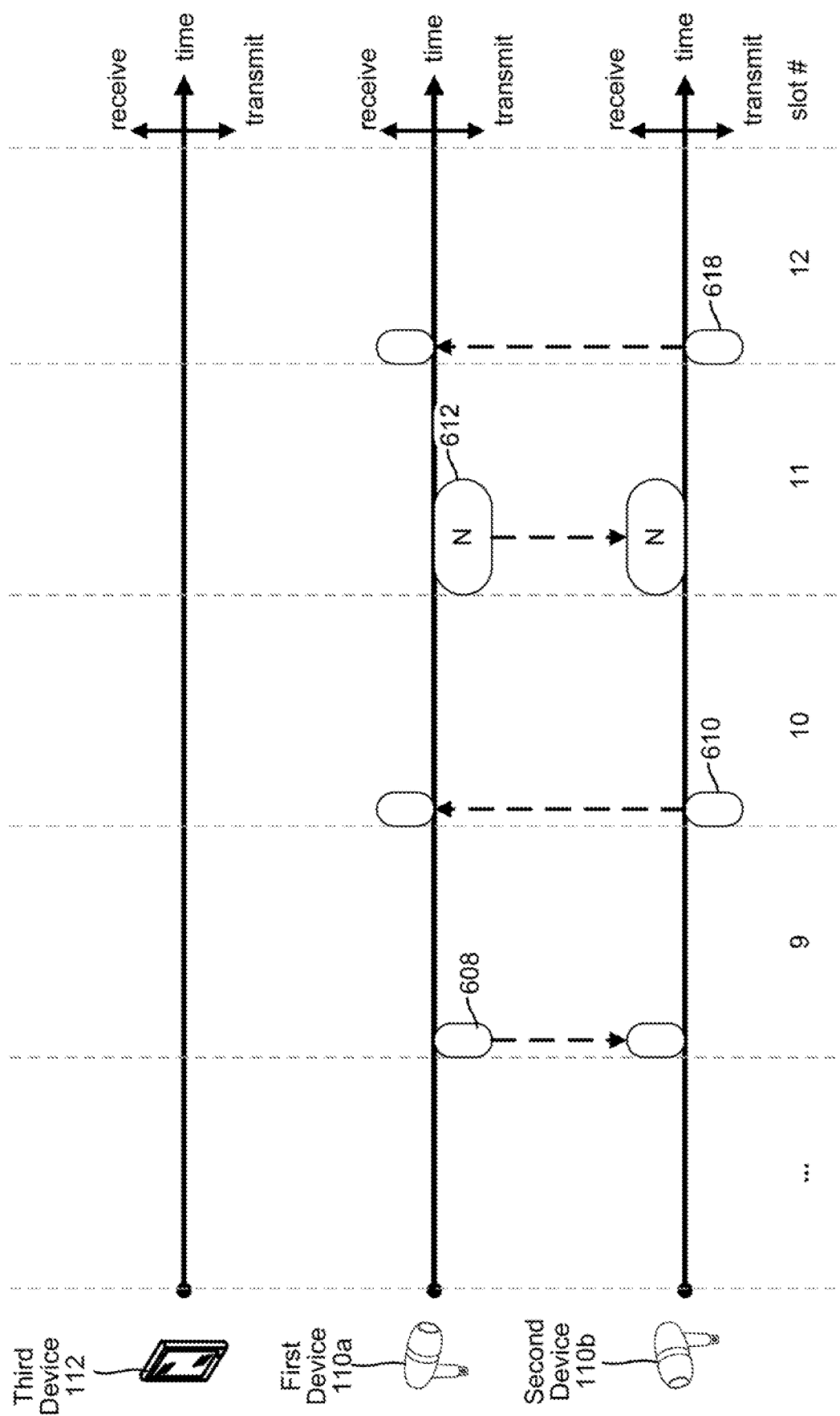

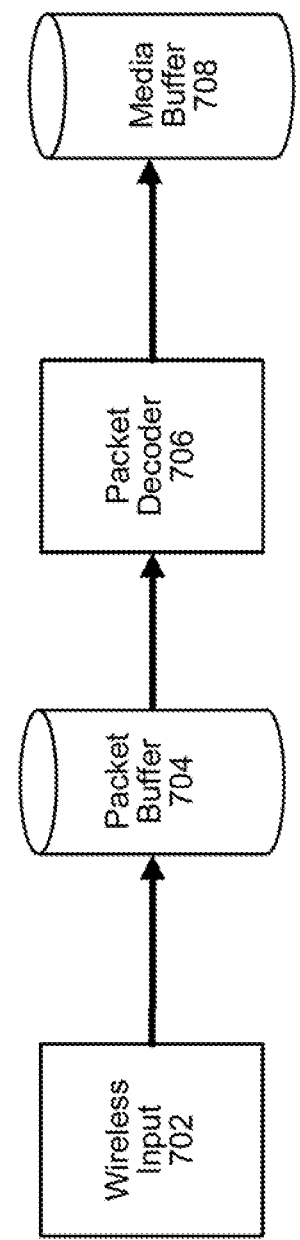

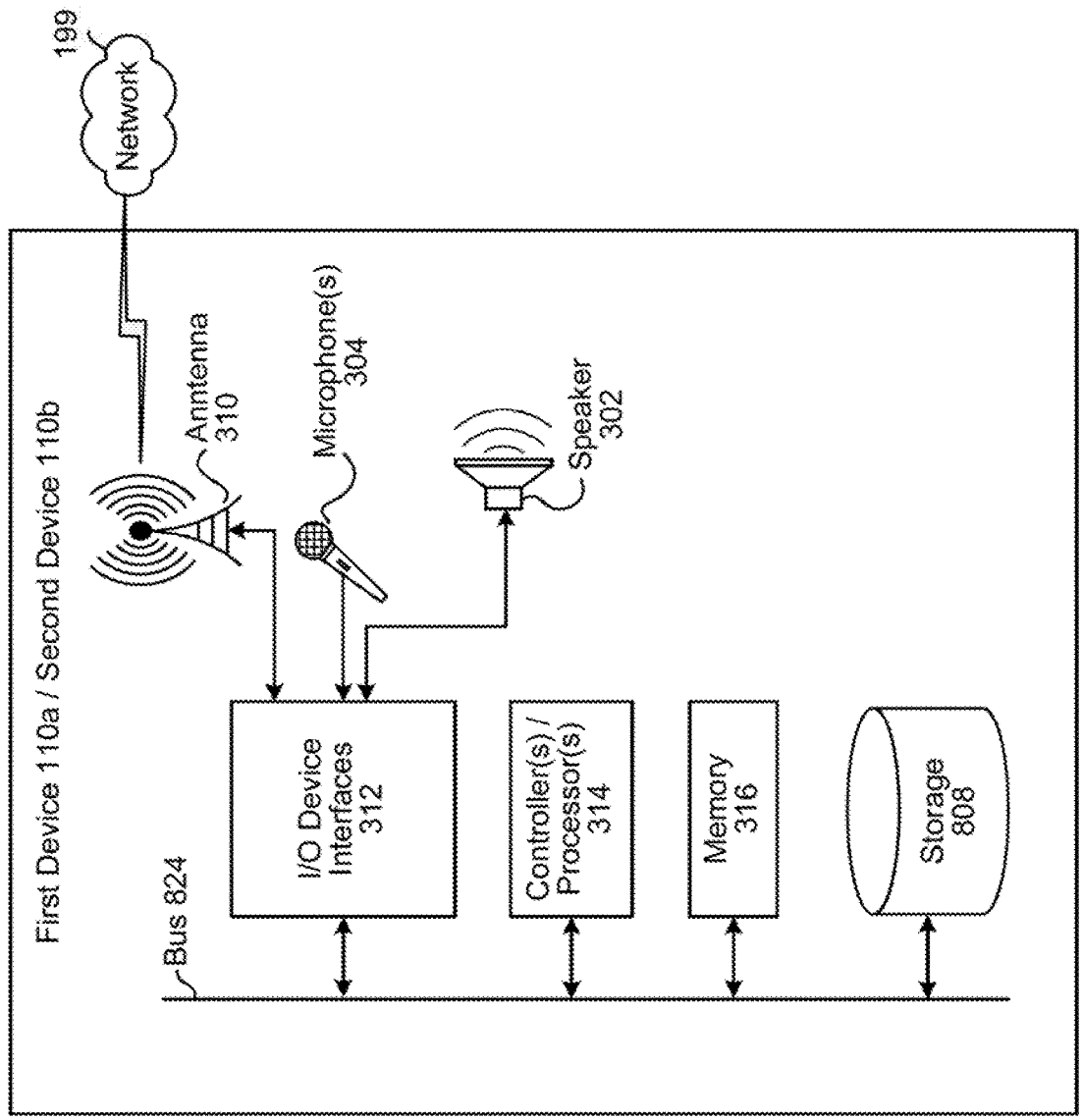

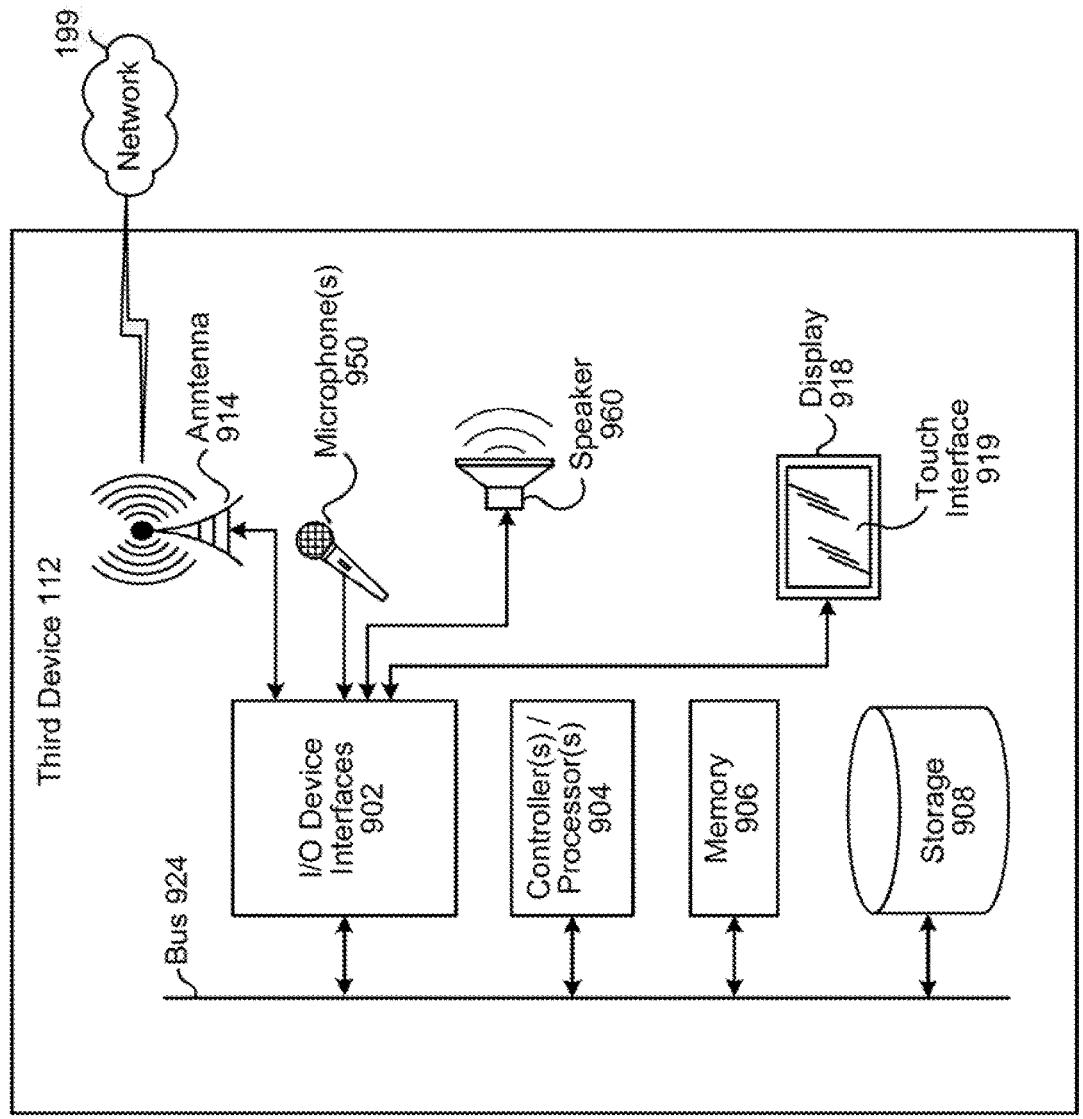

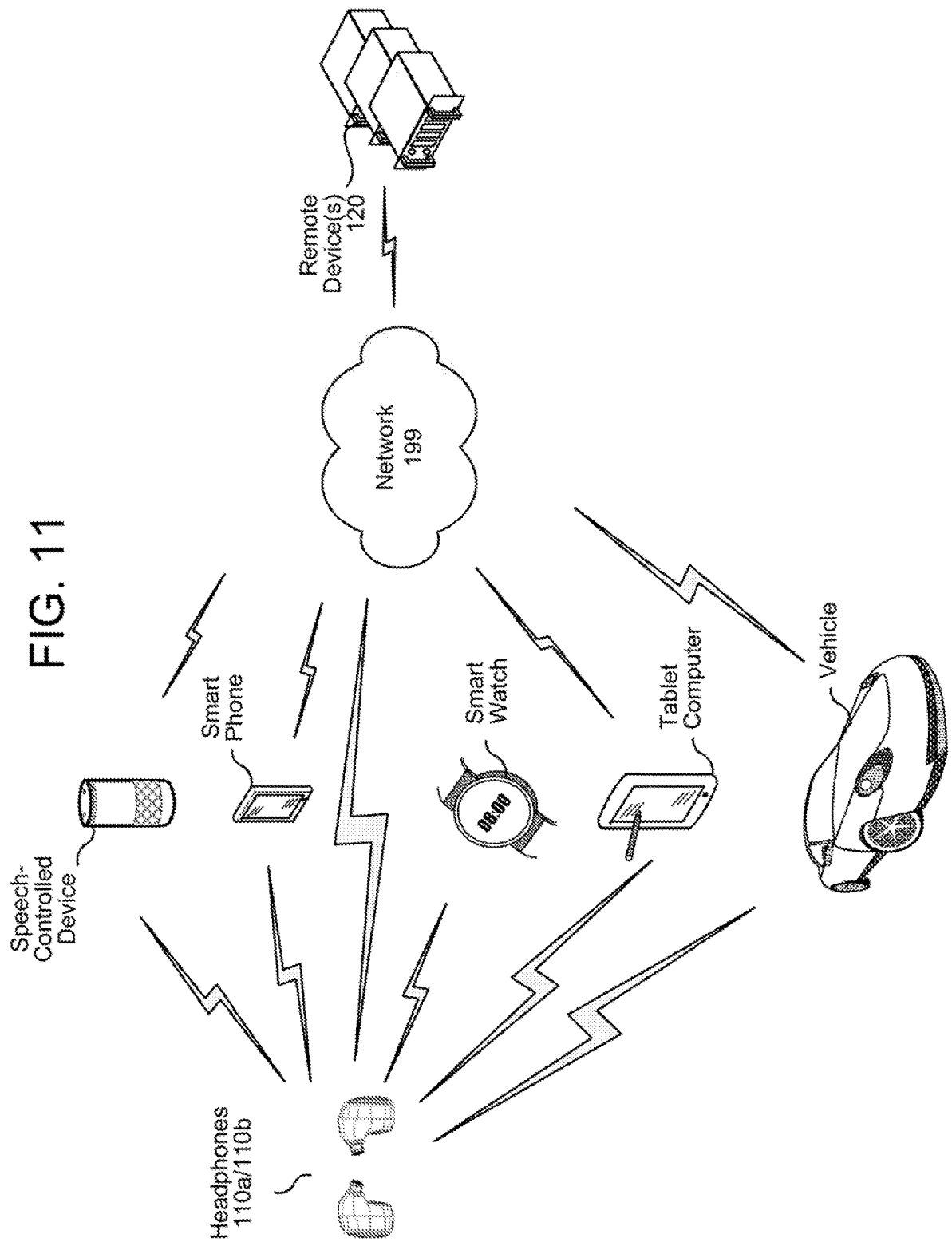

ical Patent Application No. 62/656,490, filed Apr. 12, 2018, and entitled "EAR-TO-EAR AUDIO DISTRIBUTION," in the names of Ganesh Batta et al., U.S. Provisional Patent Application No. 62/683,833, filed Jun. 12, 2018, and entitled "EAR-TO-EAR AUDIO DISTRIBUTION," in the names of Ganesh Batta et al., and U.S. Provisional Patent Application No. 62/586,419, filed Nov. 15, 2017, in the names of Milos Jorgovanovic et al, and entitled "BLUETOOTH WIRELESS EARBUDS,", which are herein incorporated by reference in their entirety.

SENDING AND RECEIVING WIRELESS DATA

CROSS REFERENCE TO RELATED APPLICATIONS

This application is a non-provisional of, and claims the benefit of priority to, U.S. Provisional Patent Appli-

BACKGROUND

Wireless audio devices, such as earbuds or headphones, may be used to communicate wirelessly with a user device, such as a smartphone, smartwatch, or similar device, and with each other. The wireless earbuds may be used to output audio sent from the user device, such as music, as part of two-way communications, such as telephone calls, and/or to receive audio for speech recognition. Speech-recognition systems have progressed to the point at which humans are able to interact with computing devices using their voices. Such systems employ techniques to detect when speech is occurring and to identify the words spoken by a human user based on the received audio input. Voice-activity detection, speech recognition, and natural-language understanding processing techniques enable speech-based user control of a computing device to perform tasks based on the user's spoken commands. The combination of voice-activity detection, speech recognition, and/or natural-language understanding processing techniques is referred to herein as speech processing. Speech processing may also involve converting a user's speech into text data, which may then be provided to various text-based software applications.

BRIEF DESCRIPTION OF DRAWINGS

For a more complete understanding of the present disclosure, reference is now made to the following description taken in conjunction with the accompanying drawings.

FIGS. 1A and 1B illustrate a system configured to send and receive data using a wireless connection according to embodiments of the present disclosure.

FIGS. 3A and 3B are conceptual diagrams of components of a wireless connection system according to embodiments of the present disclosure.

FIG. 4 is a conceptual diagram of components of a wireless connection according to embodiments of the present disclosure.

FIGS. 5A-5D illustrate sending and receiving audio data using first and second devices according to embodiments of the present disclosure.

FIGS. 6A-6D illustrate sending and receiving voice data using first and second devices according to embodiments of the present disclosure.

FIGS. 7A and 7B illustrate primary and secondary audio buffers according to embodiments of the present disclosure.

FIG. 8 is a block diagram conceptually illustrating example audio devices according to embodiments of the present disclosure.

FIG. 9 is a block diagram conceptually illustrating an example user device according to embodiments of the present disclosure.

FIG. 11 illustrates an example of a computer network for use with the device provisioning system.

DETAILED DESCRIPTION

Figure 2A:
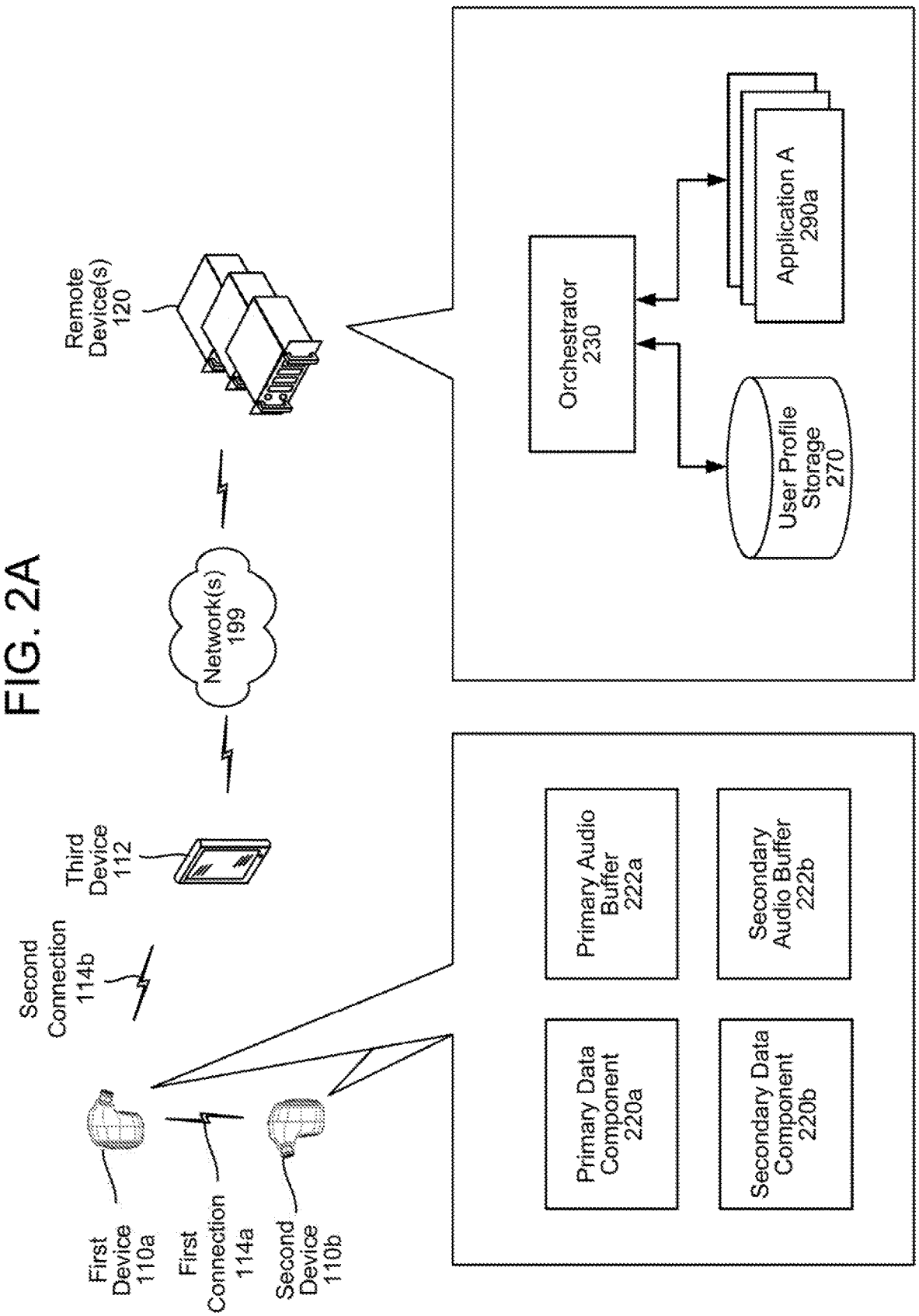
FIG. 2A illustrates a system configured to send and receive data using a wireless connection according to embodiments of the present disclosure.

Some electronic devices may include an audio-based input/output interface. A user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a speaker, for outputting audio that in some embodiments responds to and/or prompts for the voice input.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "headphones" may refer to any hands-free, wearable audio input/output device and includes headsets, earphones, earbuds, or any similar device. For added convenience, the user may choose wireless headphones, which communicate with the device—and optionally each other—via a wireless connection, such as Bluetooth, WI-FI, near-field magnetic induction (NFMI), LTE, or any other type of wireless connection.

In the present disclosure, for clarity, headphone components that are capable of communication with both a third device and each other are referred to as "wireless earbuds," but the term "earbud" does not limit the present disclosure to any particular type of wired or wireless headphones. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth connection); the primary earbud further communicates with a third device (such as a smartphone, smart watch, or similar device) using a second connection (such as a Bluetooth connection). The secondary earbud communicates directly with only with the primary earbud and does not communicate using a dedicated connection directly with the smartphone; communication therewith may pass through the primary earbud via the first wireless connection.

The primary and secondary earbuds may include similar hardware and software; in other instances, the secondary earbud contains only a subset of the hardware/software included in the primary earbud. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device." The first, second, and/or third devices may communicate over a network, such as the Internet, with one or more server devices, which may be referred to as "remote device(s)."

Wireless earbuds, which communicate wirelessly not only with a third device (such as a mobile device, tablet, etc.) but with each other, may be more desirable and/or convenient to users because the earbuds do not require a wire or cord connecting them; such a cord may be distracting and/or uncomfortable. The lack of a connecting cord means, however, that each earbud requires its own power source, such as a battery, and that the power source is necessarily limited. Because the primary earbud maintains two wireless connections (one with the secondary earbud and one with the third device), it may consume power more quickly than the secondary earbud and therefore run out of battery power more quickly. Cessation of communications may be inconvenient to the user, such as if music being output by the earbuds ceases, or may be more than inconvenient if, for example, the user was engaged in an important telephone call or relying on audio navigation directions.

The present disclosure offers a system and method for sending and receiving data in which some or all of the data sent from the third device and received by the primary earbud is also received by the secondary earbud. The secondary earbud may monitor the second connection between the third device and the primary earbud and receive any data sent to the primary earbud. The secondary earbud may not transmit or send any data or information during this monitoring. This monitoring of the second connection may be referred to as "snooping" or "sniffing" the second connection. As the term is used herein, as one of skill in the art will understand, "snooping" or "sniffing" refers to third-party monitoring of a network connection, such as a wireless network connection, to determine data and/or one or more attributes regarding the network, such as stack information, baseband information, or any other such information. The secondary earbud may maintain information about the second wireless connection between the primary earbud and the smartphone, such as stack layer information and baseband-connection information. This wireless connection information may be sent from the primary earbud, or the secondary earbud may determine it by "snooping" on the second wireless connection.

The wireless connection information may include, for example, stack layer information and baseband-connection information. Specifically, the wireless connection information may include the address of the first device $110a$ and/or third device $112$, which may be a Bluetooth device address (BDA), and one or more security credentials associated with the third device $112$, which may include a link key, a BLE long-term key, a BLE identity-resolution key, or any other such credential. The wireless connection information may further include a service discovery protocol (SDP) record and/or logical-link control and adaptation protocol (L2CAP) channel information, such as channel identification (CID) information, protocol and service multiplexer (PSM) information, maximum transmission unit (MTU) information, or any other such channel information. The wireless connection information may further include radio-frequency communication (RFCOMM) link information, such as service channel number (SCN), credits, flow method, or other such link information. The wireless connection information may include profile information, such as hands-free status, advanced audio distribution profile (A2DP) information, audio/video remote-control profile (AVRCP) information, serial-port profile (SPP) information, or other such profile information. The wireless connection information may also include application-specific information, such as the application context of the first device $110a$ and/or second device $110b$, sensor-related information such as orientation information, and/or configuration information for, for example, digital-signal processing (DSP).

The secondary earbud may, however, not receive one or more packets or other data sent to the primary earbud. The primary and/or secondary earbuds thus determine a time during which the third device has temporarily stopped sending data. During this time, the primary and secondary earbuds exchange communications to determine if the secondary earbud has not received one or more packets; for example, the primary earbud may send the secondary earbud data identifying each received packet, a last received packet, a number of received packets, or similar information. The secondary earbud may use this data to determine data identifying the one or more unreceived packets and send this data to the primary earbud, which in turn transmits the corresponding packets to the secondary earbud.

FIG. 1A illustrates a system for sending and receiving wireless data including a first device $110a$ (e.g., a primary earbud) and a second device $110b$ (e.g., a secondary earbud). The first device $110a$ and the second device $110b$ communicate using a first wireless connection $114a$, which may be a Bluetooth, NFMI, or similar connection. The first device $110a$ communicates with a third device $112$, such as a smartphone, smart watch, or similar device, using a second connection $114b$, which may also be a Bluetooth or similar connection. The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection $114a$ between the first device $110a$ and the second device $110b$ is a low-power connection such as BLE; the second wireless connection $114b$ may include a high-bandwidth connection such as EDR in addition to or instead of a BLE connection. The third device $112$ may communicate with one or more remote device(s) $120$, which may be server devices, via a network $199$, which may be the Internet, a wide- or local-area network, or any other network. The first device $110a$ may output first output audio $15a$, and the second device $110b$ may output second output audio $15b$. The first device $110a$ and second device $110b$ may capture input audio $11$ from a user $5$, process the input audio $11$, and/or send the input audio 11 and/or processed input audio to the third device 112 and/or remote device(s) 120, as described in greater detail below.

In various embodiments, as also explained in greater detail below, a first audio-output device 110a receives (130) a first packet during a first time period and receives (132) a second packet during a second time period. During a third time period, the first audio-output device determines (134) that a wireless connection between the first audio-output device 110a and a second audio-output device 110b is available for sending data. For example, the first audio-output device 110a may determine that a third device 112 has ceased sending data. The first audio-output device 110a sends (136) first data corresponding to the third time period—this first data may identify at least the second packet or may identify only that the first audio-output device 110a is available for sending and receiving further data. The first audio-output device 110a receives (138), from the second audio-output device 110a, second data including a request for at least the second packet. The first audio-output device 110a then sends (140) the second packet to the second audio-output device 110a.

Referring to FIG. 1B, the second audio-output device 110b receives (142) the first packet during the first time period. The second audio-output device 110b does not, however, receive the second packet during the second time period. The second audio-output device 110b receives (144), from the first audio-output device 110a, the first data identifying the second packet. The second audio-output device 110b sends (146) the second data including a request for the second packet to the first audio-output device 110a. The second audio-output device 110b receives (148) the second packet from the first audio-output device 110a and outputs (150) audio corresponding to the first and second packets.

The system of FIGS. 1A and 1B may operate using various connection components as described in FIG. 2A. The various components may be located on the same or on different physical devices. Communication between various components may occur directly or across a network(s) 199. Below is a discussion of those components.

The devices 110a/110b may each include a primary data component 220a, a primary audio buffer 222a, a secondary data component 220b, and a secondary audio buffer 222b, which may be implemented using hardware, software, and/or firmware. In various embodiments, the primary data component 220a may be used to, for example, determine that the third device 112 has stopped sending data, determine and send information regarding received packets, and send packets requested by the secondary audio-output device 110b. The primary audio buffer 222a may be used to receive and buffer packets. The secondary data component 220b may be used to, for example, receive information regarding packets, determine that one or more packets have not been received, and receive those packets. The secondary audio buffer 222b may be used to receive, re-order, and buffer packets.

The remote device(s) 120 may include an orchestrator component 230. The orchestrator component 230 may include memory and logic that enables it to transmit and receive various pieces and forms of data to various components of the system. The remote device(s) 120 may include user profile storage 270 that may include, for example, information related to the devices 110a/110b, such as network identification or password information, and may include one or more application(s) 290.

An "application," as used herein, may be considered synonymous with a "skill." A skill may be software akin to an application. That is, a skill may enable the remote device(s) 120 and/or the application server(s) to execute specific functionality in order to provide output data to the user 5. The system may be configured with more than one skill. A skill may either be executed by the remote device(s) 120 or merely associated with the remote device(s) 120 (i.e., one executed by the application server(s)).

The devices 110a/110b may monitor ambient audio to determine whether speech is present in the audio using, for example, voice-activity detection (VAD). Once a device detects speech in the audio, it may detect if a wakeword is represented in the audio. This wakeword-detection process may also be referred to as keyword detection, with the wakeword being a specific example of a keyword. To determine whether a wakeword is spoken, the device may compare captured audio data to a stored wakeword signature. The wakeword signature may correspond to a built-in word or phrase or may be programmed by the user. When the device detects a wakeword, the device may "wake" and send captured audio data to a remote system for speech processing and a determination of output content responsive to the received audio.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus, a spoken-language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech-processing system may be configured as a relatively self-contained system in which a single device captures audio, performs speech processing, and executes a command corresponding to the input speech. Alternatively, a speech processing system may be configured as a distributed system in which a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive; significant computing resources may be needed to perform ASR and NLU processing within a reasonable time frame. Because of this expense, a distributed computing environment may be used when performing speech processing. A typical such distributed environment may involve one or more local devices having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more servers may combine to perform ASR, one or more servers may combine to perform NLU, and so on. The command may then be executed by one or a combination of remote and local devices depending on the command itself.

Figure 2B:
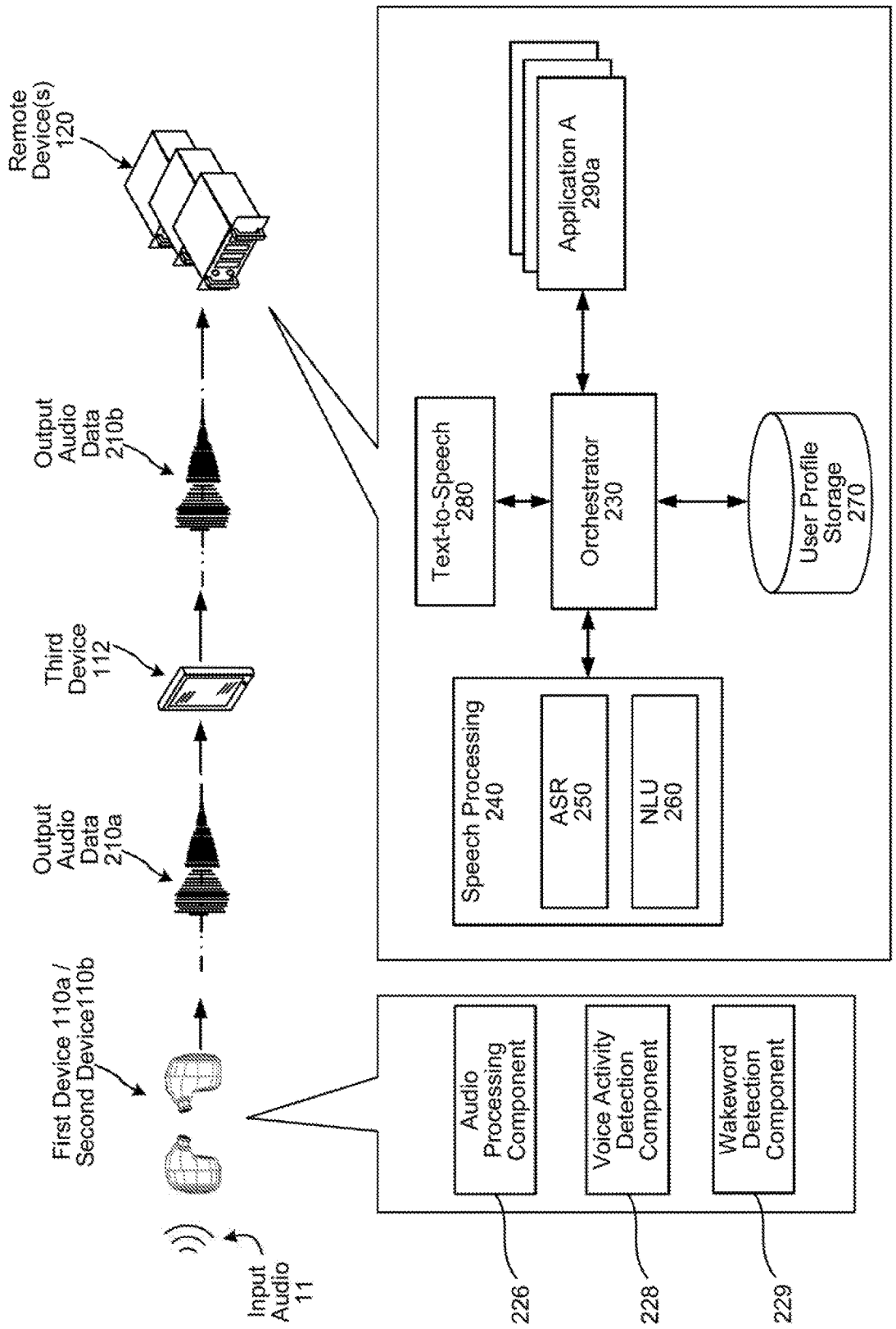
FIG. 2B illustrates a system configured to use a voice interface according to embodiments of the present disclosure.

As indicated above, the system of FIGS. 1A and 1B may operate using various speech processing and other components as described in FIG. 2B. The various components may be located on the same or on different physical devices. Communication between various components may occur directly or across a network(s) 199. Below is a discussion of those components, followed by a further discussion of capturing audio.

The devices 110a/110b may each include an audio-processing component 226, a voice-activity detection component 228, a wakeword detection component 229, and/or other components. The devices 110a/110b may receive input audio 11 using an audio capture component, such as a microphone or microphone array, as explained in more detail with reference to FIGS. 3A and 3B. The audio-processing component 226 may receive the captured audio and determine audio data based thereon. In some embodiments, the audio-processing component 226 includes a hardware and/or software analog-to-digital converter that converts the analog input audio, as captured by the microphone, into a digital audio signal for inclusion in the audio data. The analog-to-digital converter may sample the input audio 11 at any of a variety of different sample rates and amplifications. The audio-processing component 226 may further include noise reduction, automatic gain control, or any other such audio processing hardware or software. The audio-processing component 226 may include an encryption and/or compression component to encrypt and/or compress the audio data; the encryption and/or compression may conform to an industry standard, such as Bluetooth.

The voice-activity detection component 228 may monitor the input audio 11 to determine whether speech is present. For example, the voice-activity detection component 228 may analyze various quantitative aspects of the audio data, such as, for example, the spectral slope between one or more frames of the audio, the energy levels of the audio in one or more spectral bands, the signal-to-noise ratios of the audio in one or more spectral bands, and/or other quantitative aspects. In some instances, the voice-activity detection component 228 may use a trained classifier configured to distinguish speech from background noise. The classifier may be implemented using linear classifiers, support vector machines, and/or decision trees. The voice-activity detection component 228 may apply techniques using, for example, a Hidden Markov Model (HMM) or a Gaussian Mixture Model (GMM) to compare the audio data to one or more acoustic models in speech storage; the acoustic models may include models corresponding to speech, noise (e.g., environmental noise or background noise), and/or silence. The voice-activity detection component 228 may "trigger" when it determines that speech is present in the audio and may transmit notification of the trigger to, for example, the audio-processing component 226, the wakeword detection component 229, another device 110a/110b, and/or the third device 112.

The wakeword detection component 229 may process input the audio data —continuously, at intervals, and/or in response to a notification of the triggering of the VAD component—to determine if a keyword (e.g., a wakeword) is present in the audio data. In some embodiments, however, such as telephone calls or other such communications, no wakeword is needed or expected. Following detection of a wakeword, the devices 110a/110b may output audio data 210a, which may include at least a portion of the audio data, to the third device 112, which may in turn send corresponding output audio data 210b to the remote device(s) 120. The output audio data 210a may at least partially correspond to input audio 11 captured subsequent to input audio corresponding to the wakeword. That is, the input audio data may correspond to a spoken command that follows a spoken wakeword and optionally includes the spoken wakeword.

The wakeword detection component 229 may compare audio data to stored models or data to detect a wakeword. One approach for wakeword detection applies general large-vocabulary continuous speech-recognition (LVCSR) systems to decode the audio signals, with wakeword searching conducted in the resulting lattices or confusion networks. LVCSR decoding may, however, require relatively high computational resources. Another approach for wakeword detection builds HMMs for each wakeword and non-wakeword speech signals respectively. The non-wakeword speech includes other spoken words, background noise, etc. There may be one or more HMMs built to model the non-wakeword speech characteristics, which are named filler models. Viterbi decoding may be used to search the best path in the decoding graph, and the decoding output may be further processed to make the decision on keyword presence. This approach may be extended to include discriminative information by incorporating a hybrid DNN-HMM decoding framework. In another example, the wakeword detection component 229 may be built on deep neural network (DNN)/recursive neural network (RNN) structures without using a HMM. Such a wakeword detection component 229 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the remote device(s) 120, the output audio data 210b or other data may be sent to the orchestrator component 230. The orchestrator component 230 may include memory and logic that enables it to transmit and receive various pieces and forms of data to various components of the system. The orchestrator component 230 may send the output audio data 210b to a speech-processing component 240. An ASR component 250 of the speech processing component 240 may transcribe the output audio data 210b into text data representing one more hypotheses representing a spoken command represented in the output audio data 210b. The ASR component 250 may interpret the spoken command represented in the output audio data 210b based on a similarity between the spoken command and pre-established language models. For example, the ASR component 250 may compare the output audio data 210b with models for sounds (e.g., subword units, such as phonemes, senons, etc.) and sequences of sounds to identify words that match the sequence of sounds corresponding to the spoken command represented in the output audio data 210b. The ASR component 250 may send the text data generated thereby to an NLU component 260 of the speech processing component 240. The text data sent from the ASR component 250 to the NLU component 260 may include a top-scoring hypothesis or may include an N-best list including multiple hypotheses. An N-best list may additionally include a score associated with each hypothesis represented therein. Each score may indicate a confidence of ASR processing performed with respect to the hypothesis with which it is associated. While FIG. 2A illustrates components of the remote device(s) 120 communicating via the orchestrator component 230, one skilled in the art will appreciated that various components of the remote device(s) 120 may communication directly.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 may determine an intent of the command represented in the text data (e.g., an action that a user desires be performed) and/or pertinent pieces of information in the text data that allow a device (e.g., the devices 110a/110b, the remote device(s) 120, etc.) to execute the intent. For example, if the text data corresponds to "call mom," the NLU component 260 may determine that the user intended to activate a telephone application on his/her device and to initiate a call with a contact matching the entity "mom."

The remote device(s) 120 may also include various applications 290. It should be appreciated that the remote device(s) 120 may additionally or alternatively communicate with one or more application servers executing third-party applications. The applications 290 may include, for example, shopping applications, mapping applications, weather applications, taxi or car-sharing applications, or the like. In some embodiments, the applications 290 include communications applications such as telephone applications, voice-over-IP applications, or similar applications; if these applications are used, the orchestrator component may send the output audio data 210a there and not to the speech-processing component 240.

The remote device(s) 120 may include a TTS component 280 that generates audio data from text data using one or more different methods. In one method of synthesis called unit selection, the TTS component 280 matches text data against a database of recorded speech. The TTS component 280 may select matching units of recorded speech matching the text data and concatenates the units together to form audio data. In another method of synthesis, called parametric synthesis, the TTS component 280 varies parameters such as frequency, volume, and noise to create audio data including an artificial speech waveform. Parametric synthesis uses a computerized voice generator, sometimes called a vocoder.

FIGS. 3A and 3B illustrate additional features of an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110a/110b may include a speaker 302a/302b, one or more external microphone(s) 304a/304b, and one or more internal microphones 305a/305b. The speaker 302a/302b may be any type of speaker, such as an electrodynamic speaker, electrostatic speaker, diaphragm speaker, or piezo-electric speaker; the microphones 304a/304b/305a/305b may be any type of microphones, such as piezoelectric or MEMS microphones. Each device 110a/110b may include one or more microphones 304a/304b/305a/305b.

The speaker 302a/302b and microphones 304a/304b/305a/305b may be mounted on, disposed on, or otherwise connected to the device 110a/110b. The devices 110a/110b further include an inner-lobe insert 308a/308b that may bring the speaker 302a/302b and/or internal microphone(s) 305a/305b closer to the eardrum of the user and/or block some ambient noise.

One or more batteries 306a/306b may be used to supply power to the devices 110a/110b. One or more antennas 310a/310b may be used to transmit and/or receive wireless signals over the first connection 114a and/or second connection 114b; an I/O interface 312a/312b contains software and hardware to control the antennas 310a/310b and transmit signals to and from other components. A processor 314a/314b may be used to execute instructions in a memory 316a/316b; the memory 316a/316b may include volatile memory (e.g., random-access memory) and/or non-volatile memory or storage (e.g., flash memory). One or more sensors 318a/318b, such as accelerometers, gyroscopes, or any other such sensor may be used to sense physical properties related to the devices 110a/110b, such as orientation; this orientation may be used to determine whether either or both of the devices 110a/110b are currently disposed in an ear of the user (i.e., the "in-ear" status of each device). The instructions may correspond to the audio-processing component 226, voice-activity detection component 228, wakeword detection component 229, and/or other components discussed above. FIG. 4 illustrates a right view 4a and a left view 4b of a user of the first device 110a and the second device 110b.

Figure 5A:
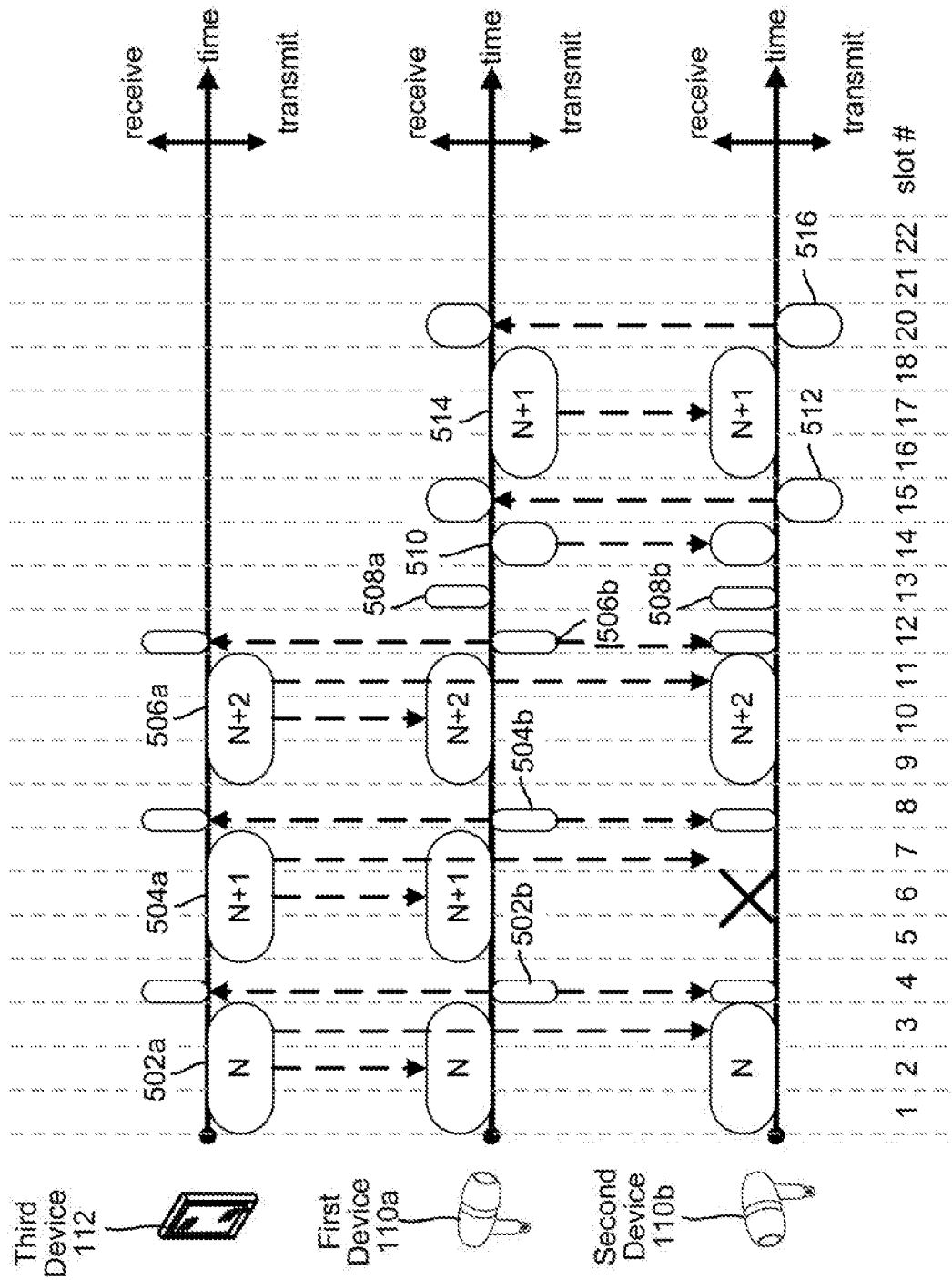

FIGS. 5A-5D illustrate sending and receiving audio data using first and second devices according to embodiments of the present disclosure. With reference first to FIG. 5A, a third device 112 sends data, which may be configured as one or more packets, to a first device 110a over a second wireless connection 114b; the first device 110a is connected to a second device 110b over a first wireless connection 114a. The packets may be advanced audio distribution profile (A2DP) packets; the present disclosure is not, however, limited to any particular type of packet. The third device 112 sends a first packet N 502a to the first device 110a, which sends an acknowledgement of receipt 502b. If the third device 112 does not receive the acknowledgement 502b, it may re-send the packet N 502a. The second device 110b also receives the first packet N 502a by snooping, sniffing, or otherwise monitoring the second wireless connection 114b. As mentioned above, the second device 110b may include information regarding the second wireless connection 114b to enable or facilitate the monitoring; this information may be, for example, link key information, hopping scheme information, or other such information.

The third device 112 sends a second packet N+1 504a, which the first device 110a receives; the first device 110a sends a corresponding second acknowledgement 504b. The second device 110b does not, however, receive the second packet 504a due to, for example, network noise, an error in sending or receiving the second packet N+1 504a, or other such issue. The third device 112 sends a third packet N+2 506a, which is received by both the first device 110a and the second device 110b; the first device 110a sends a corresponding third acknowledgement 506b.

After sending the third packet 506a, the third device 112 has, at that time, no further packets to send. The first device 110a and/or the second device 110b monitor the second wireless connection 114b during respective time periods 508a/508b to determine that the third device 112 is not sending a fourth packet. After determining that the third device 112 is not sending a fourth packet and thus determining that the first wireless connection 114a is available for sending and receiving data, the first device 110a sends first data 510 to the second device 110b; the first data 510 may include information identifying one or more of the packets 502a, 504a, 506a or may include information indicating that the first device 110a is available to send and receive additional data. The first data 510 may include, for example, information identifying each packet 502a, 504a, 506a, the last-sent packet 506a, a number of packets sent, or other such information.

Before, during, or after receiving the first data 510, the second device 110b determines if it has received all of the packets 502a, 504a, 506a. For example, the second device 110a may compare a number of received packets to a number of packets in the first data 510, may compare information identifying a last received packet to the first data 510, or may determine that, based on receiving the third packet 506a, that the second packet 504a is missing. If the first data 510 does not include information identifying any packets, the second device 110b may determine that is has not received the second packet 504a by determining that a slot—i.e., a time interval assigned for communication or other span of time—during which it expected to receive the second packet 110b does not contain the second packet. The second device 110b thus sends second data 512 to the first device 110a; the second data 512 identifies the second packet 504a. Based on receiving the second data 512, the first device 110a transmits a copy of the second packet 514 to the second device 110b. The second device 110b sends an acknowledgement 516 in response; if the first device 110a does not receive the acknowledgement 516, it may re-send the copy of the second packet 514 to the second device 110b. For example, the first device 110a may determine that a time of monitoring the first wireless connection 114a satisfies a condition, such as exceeding a threshold time. The first data 510 and second data 512 may be a POLL-NULL packet exchange.

In some embodiments, as illustrated in FIG. 5A, the passage of time for sending the packets and other data may be divided into time intervals for communication or "slots." The time intervals may be assigned for Bluetooth communication. The first packet 502a may be sent, for example, during slots 1-3, and the first acknowledgement 502b may be sent during a fourth slot. The first device 110a and/or second device 110b may monitor the second wireless connection 114b during a $13^{th}$ slot at least because a fourth packet, if sent by the third device 112, would appear in this slot. In some embodiments, as shown in FIG. 5A, the first device 110a sends the first data 510 during the $14^{st}$ slot, and the second device 110b sends the second data during a $15^{th}$ slot. In other embodiments, as shown in FIG. 5B, the first device 110a sends the first data 510 during a second half of the $13^{th}$ slot, and the second device 110b sends the second data 512 during a first half of the $14^{th}$ slot. In various embodiments, the time periods 508a/508b occur during a first half of a first Bluetooth slot, and the first data 510 is transmitted during the second half of the first Bluetooth slot. The second data 512 is transmitted during a first half of a second Bluetooth slot that directly follows the first Bluetooth slot. The three operations (monitoring 508a/508b and the sending of the first data 510 and the second data 512) thus occupy only two Bluetooth slots. The sending of data within any slot or any portion of any slot is, however, within the scope of the present disclosure.

Figure 5C:
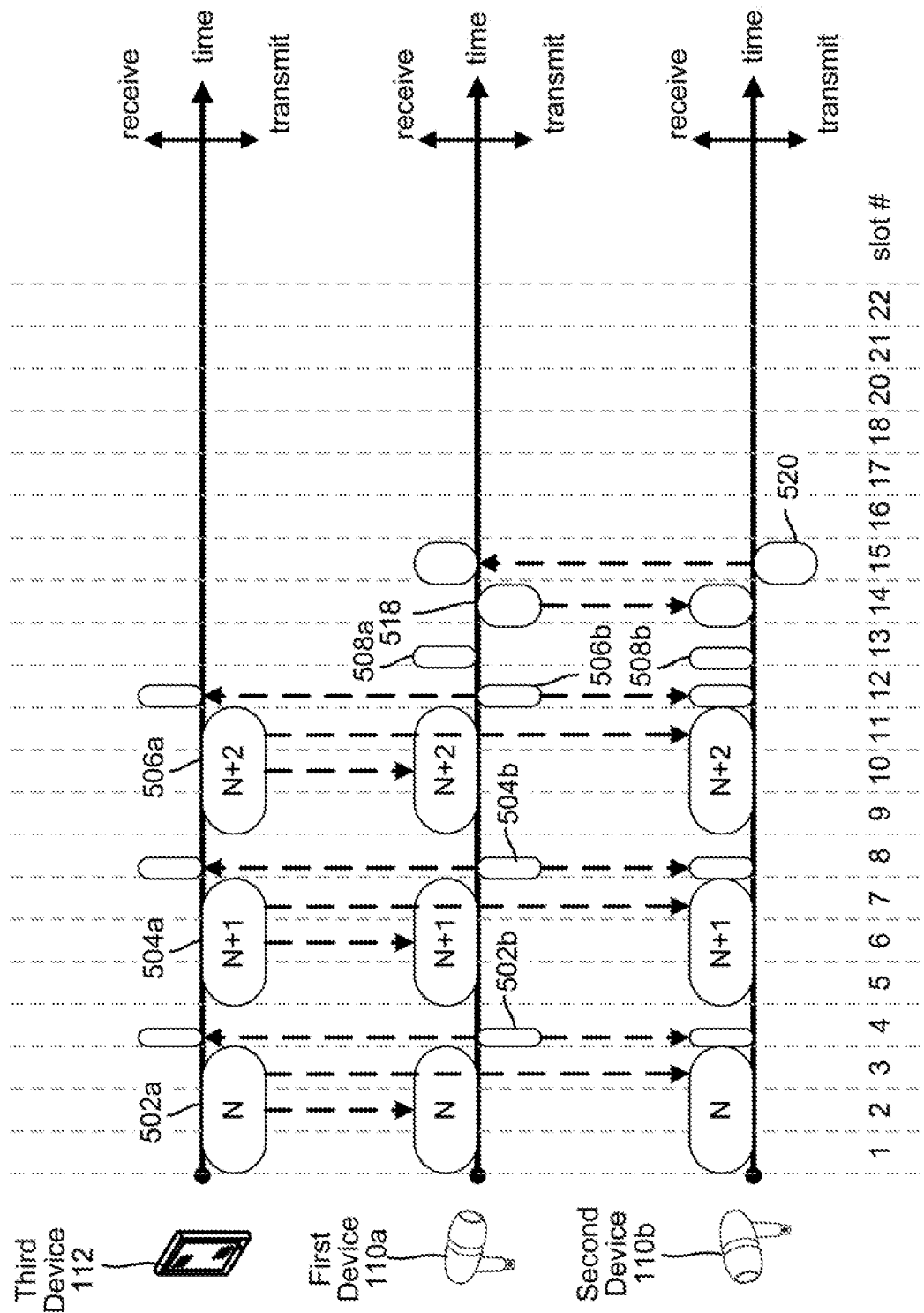

With reference to FIG. 5C, the third device sends three packets 502a, 504a, 506a; both the first device 110a and second device 110b receive all three packets 502a, 504a, 506a. The first device 110a sends first data 518 identifying one, some, or all of the three packets 502a, 504a, 506a; in response, the second device 110b sends second data 520 acknowledging or confirming receipt of the three packets 502a, 504a, 506a. As shown in FIG. 5C, the first device 110a may send the first data 518 during a $14^{th}$ slot, and the second device 110b may send the second data 520 during a $15^{th}$ slot. In other embodiments, as shown in FIG. 5D, the first device 110a sends the first data 518 during a second half of the $13^{th}$ slot, and the second device 110b sends the second data 520 during a first half of the $14^{th}$ slot.

FIGS. 6A-6D illustrate sending and receiving voice data using first and second devices according to embodiments of the present disclosure. The voice data may be sent using a Bluetooth eSCO protocol, but the present disclosure is not limited to any particular protocol. As mentioned above, with reference first to FIG. 6A, a first device 110a is connected to a third device 112 using a second wireless connection 114b; a second device 110b monitors the second wireless connection 114b using, in some embodiments, information about the second wireless connection 114b. The third device 112 sends a first packet N 602; the first device 110a receives the first packet 602 but the second device 110b does not receive the first packet 602. The first device 110a sends a second packet 604; the third device 112 receives the second packet 604, as may the second device 110b. The third device 112 may send data 606 indicating that it, for the time being, has no further packets to send.

Figure 6A:
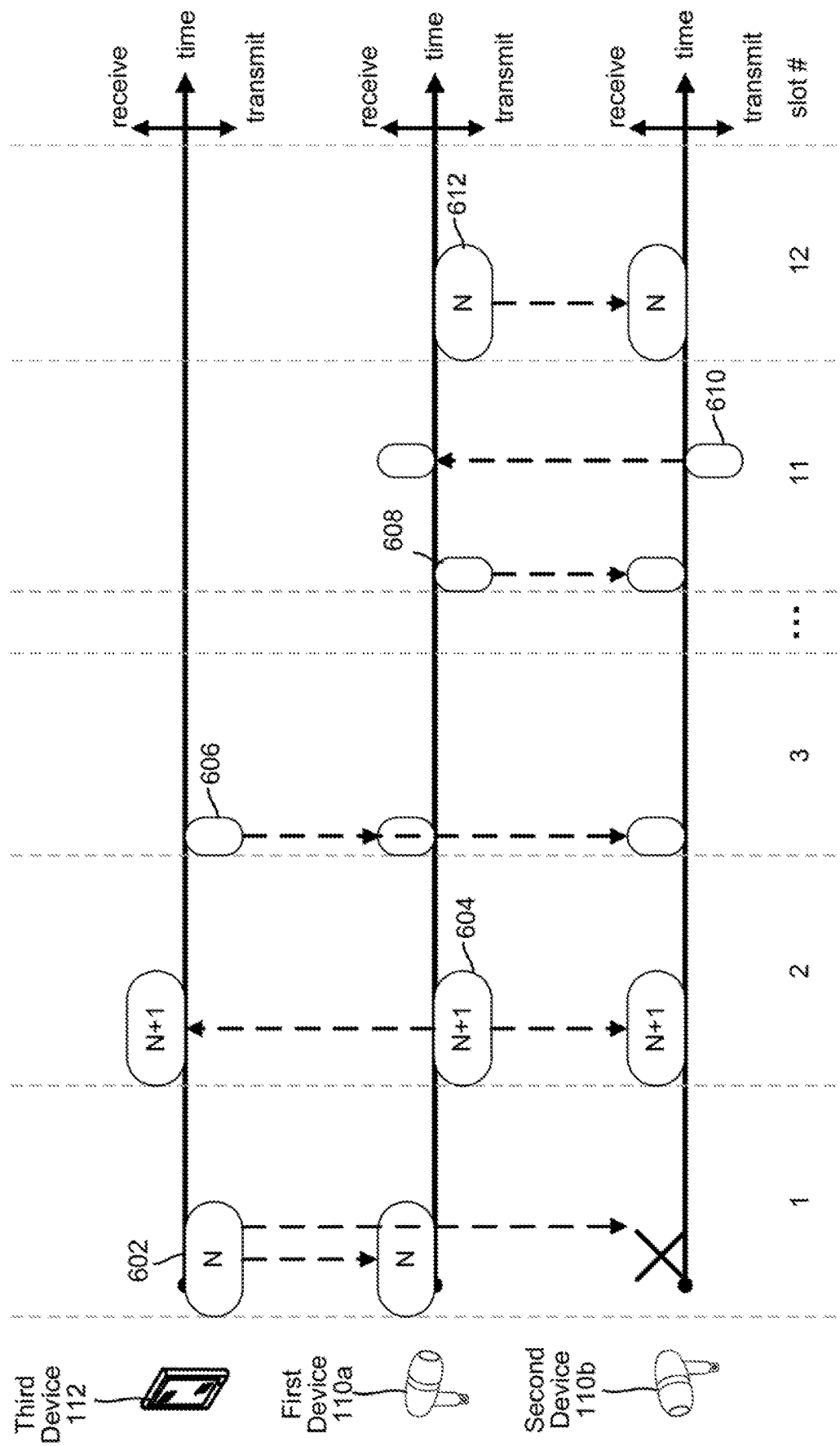
Figure 6B:
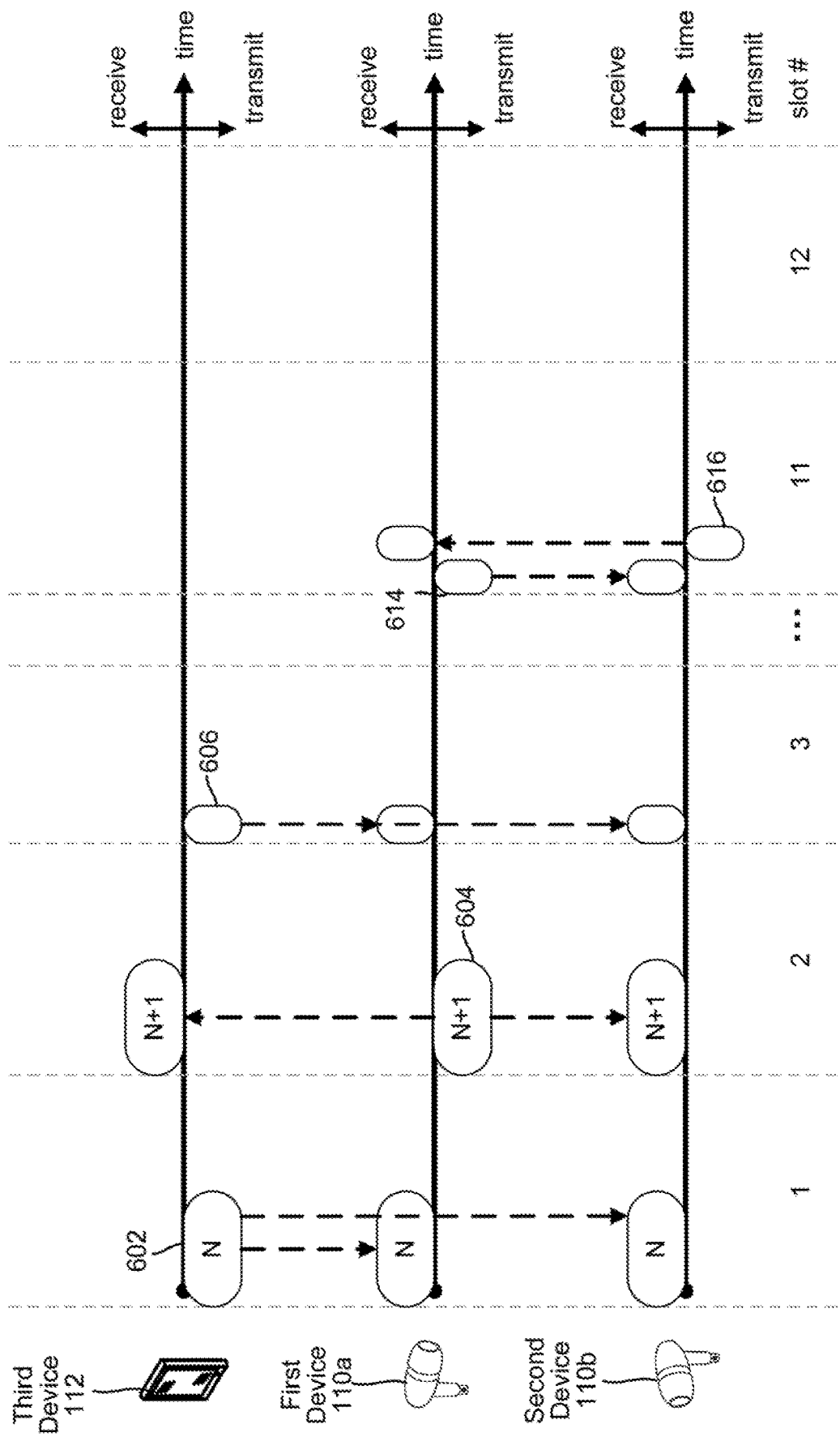

In an $11^{th}$ slot, the first device 110a sends first data 608 to the second device 110b; the first data 608 may include information regarding the received packets, such as an identifier corresponding to a last-received packet, number of received packets, or other such information. The second device 110b responds with second data 610 identifying the first packet 602 as a packet that was not received by the second device 110b. In a $12^{th}$ slot, the first device 110a sends a copy of the first packet 612 to the second device 110b. With reference to FIG. 6B, in some embodiments, the second device 110b receives all of the packets sent by the third device 112; in these embodiments, the first device 110a sends first data 614 indicating information regarding the received packets, and the second device 110b responds with second data 616 indicating that the second device 110b received all of the packets.

In some embodiments, with reference to FIG. 6C, the second device 110b sends second data 610 indicating an unreceived packet, but, when the first device 110a responds by sending the corresponding packet 612, the second device 110b does not receive the packet 612. The second device 110b may thus send the second data 610 again, and the first device 110a may, based on receiving the second data 610 again, re-send the packet 612. With reference to FIG. 6D, the first device 110a may send the first data 608 during a $9^{th}$ slot, the second device 110b may send the second data 610 during a $10^{th}$ slot, the first device 110a may send the packet 612 during an $11^{th}$ slot, and the second device 618 may send an acknowledgement 618 during a $12^{th}$ slot.

Figure 7B:
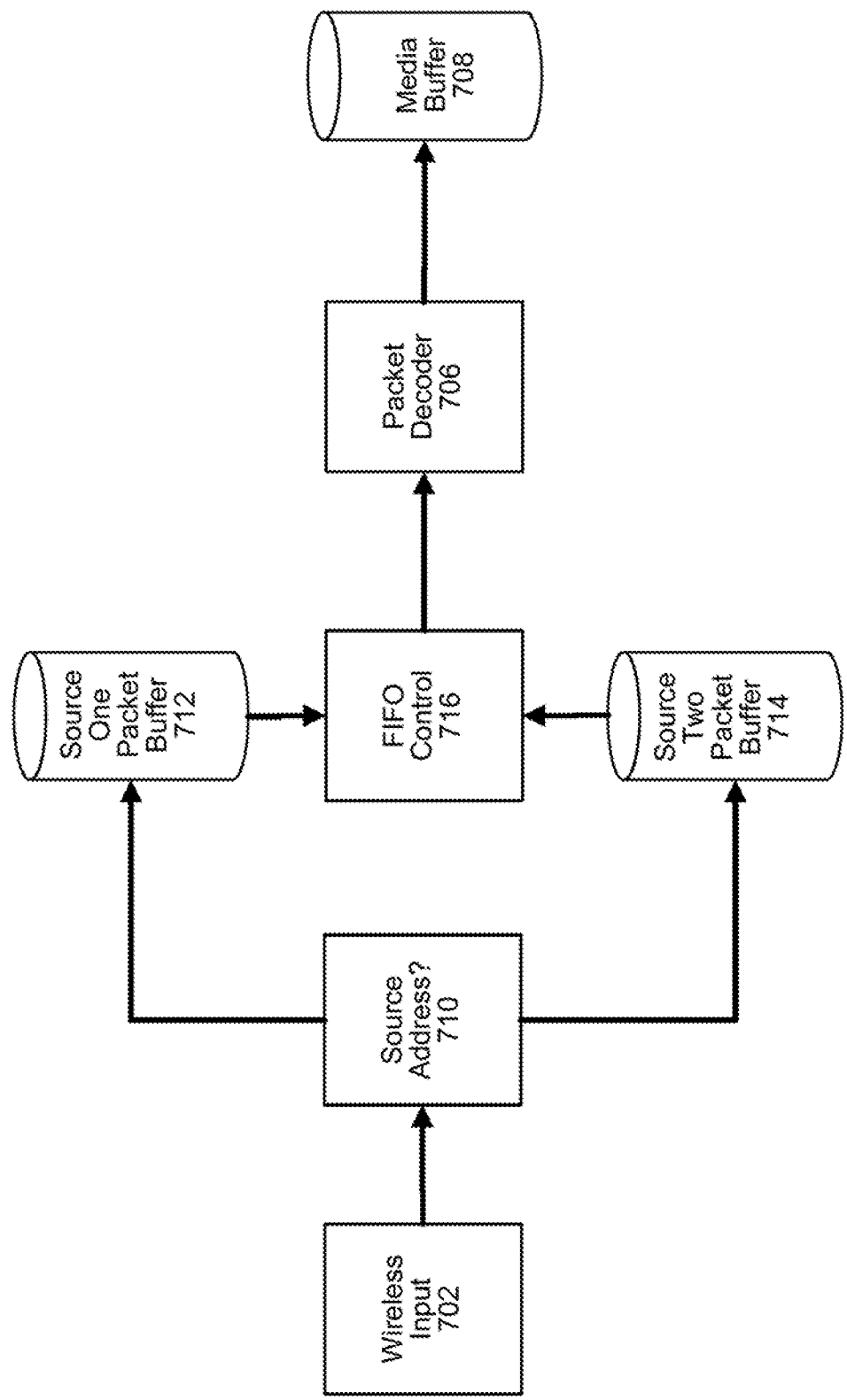

FIGS. 7A and 7B illustrate packet buffers as used by the first device 110a and/or second device 110b. As mentioned above, the first device 110a and second device 110b may include the same hardware and/or software and thus each of the first device 110a and second device 110b may include both audio buffers. Referring first to FIG. 7A, packets may be received from a wireless input 702 and stored in a packet buffer 704. A packet decoder 706 may decode the packets; the decoded packets may be stored in a media buffer 708 for output. With reference to FIG. 7B, the second device 110b may include circuitry 710 for determining a source address of packets received from the wireless input 702. If the source of a packet is a first source (e.g., the third device 112), the packet may be placed in a first packet buffer 712. If the source of a packet is a second source (e.g., the first device 110a), the packet may be placed in a second packet buffer 714. A first-in-first-out (FIFO) controller 716 may determine if any packets were received out-of-order and, if so, re-order them before sending them to the packet decoder 706 and media buffer 708. In some embodiments, the FIFO controller 716 may determine that a packet is needed or missing but that waiting for the packet is taking too long and further waiting may cause output audio to stop or stutter. For example, the FIFO controller 716 may determine that a difference between sending a request for the missing packet and a present time satisfies a condition (e.g., the time is greater than a threshold time) and cause audio corresponding to received packets to be output. In some embodiments, the FIFO controller 716 may determine that a packet was received twice, once from each of the sources. For example, the second device 110b may receive a packet that the first device 110a did not, and the first device 110a may later receive and send the packet. In these embodiments, the FIFO controller 716 may discard or ignore the duplicate packet.

Figure 10:
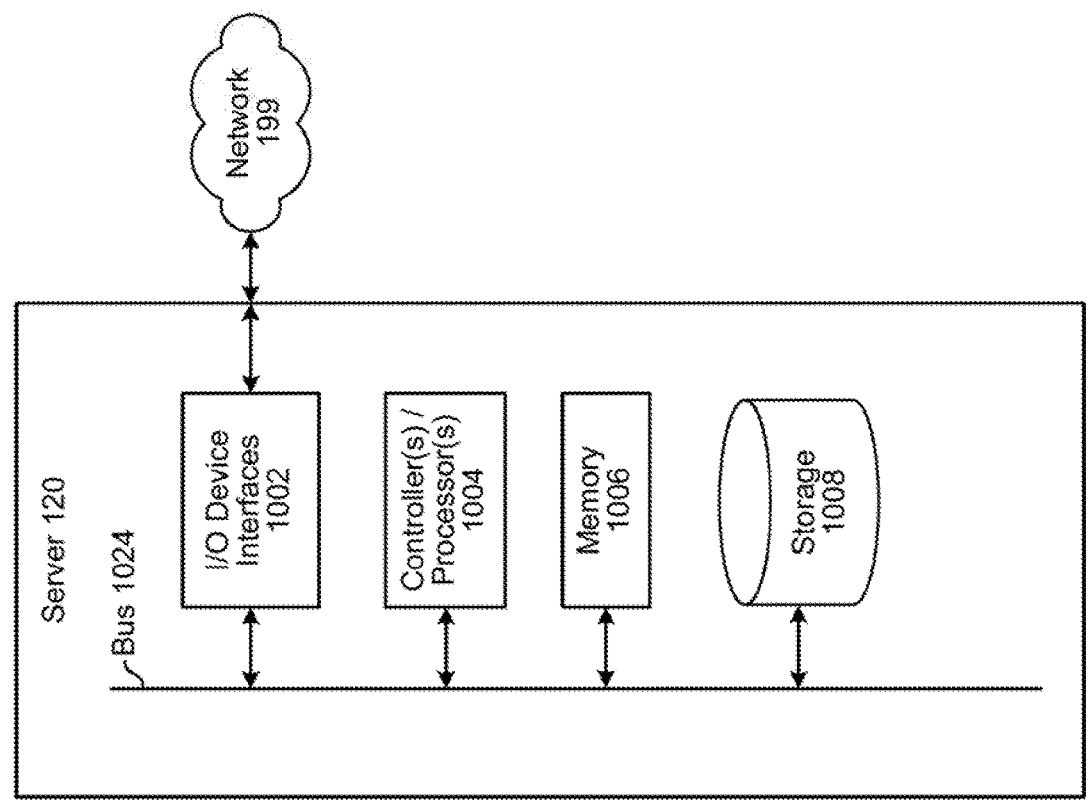
FIG. 10 is a block diagram conceptually illustrating an example remote device according to embodiments of the present disclosure.

FIG. 8 is a block diagram conceptually illustrating a first device 110a or second device 110b that may be used with the described system. FIG. 9 is a block diagram conceptually illustrating a third device 112 that may be used with the described system. FIG. 10 is a block diagram conceptually illustrating example components of a remote device, such as a remote server 120, that may assist with ASR, NLU processing, command processing, or the like. Multiple such devices 120 may be included in the system, such as one server(s) 120 for network provisioning, one server(s) for performing ASR, one server(s) 120 for performing NLU, etc. In operation, each of these devices (or groups of devices) may include computer-readable and computer-executable instructions that reside on the respective device (110a/110b/112/120), as will be discussed further below.

Each of these devices (110a/110b/112/120) may include one or more controllers/processors (314/904/1004), which may each include a central processing unit (CPU) for processing data and computer-readable instructions and a memory (316/906/1006) for storing data and instructions of the respective device. The memories (316/906/1006) may individually include volatile random-access memory (RAM), non-volatile read-only memory (ROM), non-volatile magnetoresistive (MRAM) memory, and/or other types of memory. Each device may also include a data-storage component (1008/908/1008), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (312/902/1002).

Computer instructions for operating each device (110a/110b/112/120) and its various components may be executed by the respective device's controller(s)/processor(s) (314/904/1004), using the memory (316/906/1006) as temporary "working" storage at runtime. A device's computer instructions may be stored in a non-transitory manner in non-volatile memory (316/906/1006), storage (1008/908/1008), or an external device(s). Alternatively, some or all of the executable instructions may be embedded in hardware or firmware on the respective device in addition to or instead of software.

Each device (110a/110b/112/120) includes input/output device interfaces (312/902/1002). A variety of components may be connected through the input/output device interfaces, as will be discussed further below. Additionally, each device (110a/110b/112/120) may include an address/data bus (824/924/1024) for conveying data among components of the respective device. Each component within a device (110a/110b/112/120) may also be directly connected to other components in addition to (or instead of) being connected to other components across the bus (824/924/1024).

For example, via the antenna 310/914, the input/output device interfaces 312/802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to the device 110a/110b/112 of FIGS. 8 and 9, the device 110a/110b/112 may also include input/output device interfaces 31/902 that connect to a variety of components, such as an audio output component like a speaker 302/960 or other component capable of outputting audio. The device 110a/110b/112 may also include an audio capture component which may be, for example, a microphone 304/950 or array of microphones. The microphone 1050/950 may be configured to capture audio. The microphones 304a and 304b may be used to determine an approximate distance to a sound's point of origin; acoustic localization, based on time and/or amplitude differences between sounds captured by different microphones of the array, i.e., beam forming, may be performed. The device 110a/110b/112 (using microphone 304/950, wakeword detection module 229, ASR module 250, etc.) may be configured to determine audio data corresponding to detected audio. The device 110a/110b/112 (using input/output device interfaces 312/802, antenna 310/814, etc.) may also be configured to transmit the audio data to server 120 for further processing or to process the data using internal components such as a wakeword detection module 229. As a way of indicating to a user that a wireless connection to another device has been created, the device 110a/110b/112 may be configured with a visual indicator, such as an LED or similar component (not illustrated), that may change color, flash, or otherwise provide visual indications by the device 110a/110b/112. The device 112 may include a display 918, which may comprise a touch interface 919.

The device 110a/110b may include a wakeword-detection component 229. The wakeword detection component 229 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110a/110b may be configured collectively to identify a set of the directional audio signals in which the wake expression is detected or in which the wake expression is likely to have occurred.

The wakeword detection component 229 receives captured audio and processes the audio to determine whether the audio corresponds to particular keywords recognizable by the device 110a/110b. The storage 808 may store data relating to keywords and functions to enable the wakeword detection component 229 to perform the algorithms and methods described above. The locally stored speech models may be pre-configured based on known information, prior to the device 110a/110b being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110a/110b prior to the user device 110a/110b being delivered to the user or configured to access the network by the user. The wakeword detection component 229 may access the storage 1008 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and server 120, as illustrated in FIGS. 8, 9, and 10, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

As illustrated in FIG. 11 multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Headphones 110a/110b may similarly be connected to the remote device(s) 120 either directly or via a network connection to one or more of the local devices. The headphones 110a/110b may capture audio using one or more microphones or other such audio-capture devices; the headphones 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, at a first audio-output device during a first time period, a first data packet;
   receiving, at the first audio-output device during a second time period, a second data packet;
   determining that a wireless connection between the first audio-output device and a second audio-output device is capable of transmitting data during a third time period based at least in part on determining that a third device has ceased sending data;

sending, from the first audio-output device to the second audio-output device during the third time period, first data indicating that the wireless connection is available;

receiving, from the second audio-output device during the third time period, second data including a request for the second data packet; and sending, from the first audio-output device during the third time period, the second data packet to the second audio-output device.

2. The computer-implemented method of claim 1, further comprising:

receiving, at the second audio-output device during the first time period, the first data packet;

receiving, at the second audio-output device, the second data packet;

determining a first time of sending the first data packet;

determining a second time of sending the second data packet;

determining that the second time is before the first time;

outputting, during a fourth time period, first audio corresponding to the second data packet; and outputting, during a fifth time period occurring after the fourth time period, second audio corresponding to the first data packet.

3. The computer-implemented method of claim 2, further comprising:

storing the first data packet in a first packet buffer;

storing the second data packet in a second packet buffer;

based on determining that the second time occurs before the first time, storing the second data packet in a first-in-first-out buffer; and after storing the second data packet in the first-in-first-out buffer, storing the first data packet in the first-in-first-out buffer.

4. The computer-implemented method of claim 1, further comprising:

sending, by the second audio-output device to the first audio-output device, during a fourth time period, third data including a request for a third data packet;

determining that a time difference between an end of the fourth time period and a present time is greater than a threshold time; and based at least in part on determining that the time difference is greater than the threshold time, outputting, during a fifth time period after the fourth time period, first audio corresponding to the first data packet and the second data packet.

5. The computer-implemented method of claim 1, further comprising:

after sending the second data packet from the first audio-output device, receiving, at the first audio-output device during a first half of a first Bluetooth slot, third data including acknowledgement of receipt of the second data packet, wherein sending the second data packet occurs during a second half of a second Bluetooth slot and wherein determining that the wireless connection is capable of transmitting data occurs during a first half of the second Bluetooth slot.

6. The computer-implemented method of claim 1, further comprising:

after sending, from the first audio-output device to the second audio-output device, the second data packet, waiting, by the first audio-output device, for acknowledgement of receipt of the second data packet;

determining that a time of waiting is greater than a threshold time; and based at least in part on determining that the time is greater than the threshold time, re-sending, from the first audio-output device, the second data packet.

7. The computer-implemented method of claim 1, wherein determining that the wireless connection between the first audio-output device and the second audio-output device is capable of transmitting data further comprises:

waiting, during the third time period, by the first audio-output device, for receipt of a third data packet sent from the third device; and determining that the third device has not transmitted the third data packet during the third time period.

8. The computer-implemented method of claim 1, further comprising:

receiving, at the second audio-output device during a fourth time period, a first copy of a third data packet;

receiving, at the second audio-output device during a fifth time period, a second copy of the third data packet;

determining that the first copy and the second copy correspond to the third data packet; and discarding one of the first copy or the second copy.

9. The computer-implemented method of claim 1, wherein:

the first time period is assigned for first Bluetooth communication, the second time period is assigned for second Bluetooth communication, the third time period is assigned for third Bluetooth communication, and determining that the wireless connection is available for sending data comprises determining that the third time period does not include a third data packet.

10. The computer-implemented method of claim 1, wherein determining that the wireless connection is capable of transmitting data comprises:

receiving, from the third device at the first audio-output device, an indication of ending of transmission; and after receiving the indication, outputting, by the first audio-output device, voice audio corresponding to the first data packet and the second data packet.

11. The computer-implemented method of claim 1, further comprising:

establishing the wireless connection between the first audio-output device and the second audio-output device using a Bluetooth protocol; and wherein the request for the second data packet is received by the first audio-output device from the second audio-output device over the wireless connection using the Bluetooth protocol and the second data packet is sent from the first audio-output device to the second audio-output device over the wireless connection using the Bluetooth protocol.

12. A system comprising:

at least one processor; and at least one memory including instructions that, when executed by the at least one processor, cause the system to:

receive, at a first audio-output device during a first time period, a first data packet;

receive, at the first audio-output device during a second time period, a second data packet;

determine that a wireless connection between the first audio-output device and a second audio-output device is capable of transmitting data during a third time period based at least in part on determining that a third device has ceased sending data;

send, from the first audio-output device to the second audio-output device during the third time period, first data indicating that the wireless connection is available;

receive, from the second audio-output device during the third time period, second data including a request for the second data packet; and send, from the first audio-output device during the third time period, the second data packet to the second audio-output device.

13. The system of claim 12, wherein the at least one memory further includes instructions that, when executed by the at least one processor, further cause the system to:

receive, at the second audio-output device during the first time period, the first data packet;

receive, at the second audio-output device, the second data packet;

determine a first time of sending the first data packet;

determine a second time of sending the second data packet;

determine that the second time is before the first time;

output, during a fourth time period, first audio corresponding to the second data packet; and output, during a fifth time period occurring after the fourth time period, second audio corresponding to the first data packet.

14. The system of claim 13, wherein the at least one memory further includes instructions that, when executed by the at least one processor, further cause the system to:

store the first data packet in a first packet buffer;

store the second data packet in a second packet buffer;

based on determining that the second time occurs before the first time, store the second data packet in a first-in-first-out buffer; and after storing the second data packet in the first-in-first-out buffer, store the first data packet in the first-in-first-out buffer.

15. The system of claim 12, wherein the at least one memory further includes instructions that, when executed by the at least one processor, further cause the system to:

send, by the second audio-output device to the first audio-output device, during a fourth time period, third data including a request for a third data packet;

determine that a time difference between an end of the fourth time period and a present time is greater than a threshold time; and based at least in part on determining that the time difference is greater than the threshold time, output, during a fifth time period after the fourth time period, first audio corresponding to the first data packet and the second data packet.

16. The system of claim 12, wherein the at least one memory further includes instructions that, when executed by the at least one processor, further cause the system to:

after sending the second data packet from the first audio-output device, receive, at the first audio-output device during a first half of a first Bluetooth slot, third data including acknowledgement of receipt of the second data packet, wherein sending the second data packet occurs during a second half of a second Bluetooth slot and wherein determining that the wireless connection is capable of transmitting data occurs during a first half of the second Bluetooth slot.

17. The system of claim 12, wherein the at least one memory further includes instructions that, when executed by the at least one processor, further cause the system to:

after sending, from the first audio-output device to the second audio-output device, the second data packet, wait, by the first audio-output device, for acknowledgement of receipt of the second data packet;

determine that a time of waiting is greater than a threshold time; and based at least in part on determining that the time is greater than the threshold time, re-send, from the first audio-output device, the second data packet.

18. The system of claim 12, wherein the at least one memory further includes instructions that, when executed by the at least one processor, further cause the system to:

wait, during the third time period, by the first audio-output device, for receipt of a third data packet sent from the third device; and determine that the third device has not transmitted the third data packet during the third time period.

19. The system of claim 12, wherein the at least one memory further includes instructions that, when executed by the at least one processor, further cause the system to:

receive, at the second audio-output device during a fourth time period, a first copy of a third data packet;

receive, at the second audio-output device during a fifth time period, a second copy of the third data packet;

determine that the first copy and the second copy correspond to the third data packet; and discard one of the first copy or the second copy.

20. The system of claim 12, wherein:

the first time period is assigned for first Bluetooth communication, the second time period is assigned for second Bluetooth communication, the third time period is assigned for third Bluetooth communication, and the instructions that, when executed by the at least one processor, cause the system to determine that the wireless connection is capable of transmitting data comprise instructions that, when executed by the at least one processor, further cause the system to determine that the third time period does not include a third data packet.

21. The system of claim 12, wherein the at least one memory further includes instructions that, when executed by the at least one processor, further cause the system to:

receive, from the third device at the first audio-output device, an indication of ending of transmission; and after receiving the indication, output, by the first audio-output device, voice audio corresponding to the first data packet and the second data packet.

22. A computer-implemented method comprising:

receiving, at a first audio-output device during a first time period, a first data packet;

receiving, at the first audio-output device during a second time period, a second data packet;

determining, during a first half of a first Bluetooth slot, that a wireless connection between the first audio-output device and a second audio-output device is capable of transmitting data during a second half of the first Bluetooth slot based at least in part on determining that a third device has ceased sending data;

sending, from the first audio-output device during the second half of the first Bluetooth slot, the second data packet to the second audio-output device; and after sending the second data packet, receiving, at the first audio-output device during a first half of a second Bluetooth slot, third data including acknowledgement of receipt of the second data packet.

\* \* \* \* \*